US012717141B2

(12) United States Patent
Aoki et al.

(10) Patent No.: US 12,717,141 B2
(45) Date of Patent: Aug. 25, 2026

(54) IMAGE DISPLAY APPARATUS

(71) Applicant: FUJIFILM Corporation, Tokyo (JP)

(72) Inventors: Takashi Aoki, Saitama (JP); Shigeru Kondo, Saitama (JP); Masaru Amano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 266 days.

(21) Appl. No.: 18/351,272

(22) Filed: Jul. 12, 2023

(65) Prior Publication Data

US 2023/0359046 A1 Nov. 9, 2023

Related U.S. Application Data

(63) Continuation of application No. PCT/JP2022/002757, filed on Jan. 26, 2022.

(30) Foreign Application Priority Data

Jan. 29, 2021 (JP) ................................ 2021-013413

(51) Int. Cl.
*G02B 27/00* (2006.01)
*G02B 27/01* (2006.01)

(52) U.S. Cl.
CPC ..... *G02B 27/0172* (2013.01); *G02B 27/0176* (2013.01); *G02B 2027/0178* (2013.01)

(58) Field of Classification Search
CPC ............ G02B 27/0172; G02B 27/0176; G02B 2027/0178; G02B 27/01; G02B 27/02;
(Continued)

(56) References Cited

U.S. PATENT DOCUMENTS

2012/0044571 A1* 2/2012 Mukawa .............. H04N 13/344 359/630
2013/0234915 A1 9/2013 Takeda et al.
(Continued)

FOREIGN PATENT DOCUMENTS

CN 102375235 A 3/2012
CN 111417891 A 7/2020
(Continued)

OTHER PUBLICATIONS

International Search Report issued in PCT/JP2022/002757; mailed Apr. 19, 2022.
(Continued)

*Primary Examiner* — Henry Duong
(74) *Attorney, Agent, or Firm* — Studebaker Brackett PLLC

(57) ABSTRACT

Provided is an image display apparatus that can present a high-quality image in a case in which a composite image is presented to an observer. An image display unit (10) includes a first display image light input device (20A) and a second display image light input device (20B) that input display image light, a first light guide plate (30A) and a second light guide plate (30B) that receive input of the display image light individually from the first display image light input device (20A) and the second display image light input device (20B), and propagate the input display image light to an output surface while individually reflecting the input display image light, and a mechanism that adjusts a disposition relationship between the first light guide plate (30A) and the second light guide plate (30B).

17 Claims, 31 Drawing Sheets

(58) Field of Classification Search

CPC ............ G02B 27/0101; G02B 27/0103; G02B 27/0149; G02B 27/017; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; H04N 5/64

USPC .......................................................... 359/630

See application file for complete search history.

(56) References Cited

U.S. PATENT DOCUMENTS

| | | | | |
|---|---|---|---|---|
| 2014/0055867 | A1 | 2/2014 | Inoguchi et al. | |
| 2018/0095283 | A1* | 4/2018 | Takeda ................... | G02B 6/005 |
| 2018/0299678 | A1 | 10/2018 | Singer et al. | |
| 2020/0049999 | A1* | 2/2020 | Takeda ............... | G02B 27/0172 |
| 2020/0355924 | A1 | 11/2020 | Dobschal et al. | |
| 2020/0393674 | A1 | 12/2020 | Blomstedt et al. | |
| 2021/0055561 | A1 | 2/2021 | Danziger et al. | |
| 2021/0349317 | A1* | 11/2021 | Yonezawa .......... | G02B 26/0833 |
| 2022/0004004 | A1 | 1/2022 | Masuda et al. | |
| 2022/0276492 | A1* | 9/2022 | Yamaguchi ........ | G02B 17/0856 |

FOREIGN PATENT DOCUMENTS

| | | | |
|---|---|---|---|
| CN | 111492301 | A | 8/2020 |
| CN | 111580276 | A | 8/2020 |
| CN | 112119344 | A | 12/2020 |
| JP | 2001-264683 | A | 9/2001 |
| JP | 2004-012768 | A | 1/2004 |
| JP | 2011-164545 | A | 8/2011 |
| JP | 2012-042654 | A | 3/2012 |
| JP | 2012-226199 | A | 11/2012 |
| JP | 2013-186292 | A | 9/2013 |
| JP | 2014-041280 | A | 3/2014 |
| JP | 2017223986 | A | 12/2017 |
| JP | 2018-011223 | A | 1/2018 |
| JP | 2018-054978 | A | 4/2018 |
| JP | 2020-064096 | A | 4/2020 |
| JP | 2020-112713 | A | 7/2020 |

OTHER PUBLICATIONS

International Preliminary Report on Patentability (Chapter I) and Written Opinion of the International Searching Authority issued in PCT/JP2022/002757; issued Jul. 31, 2023.

An Office Action; "Notice of Reasons for Refusal," mailed by the Japanese Patent Office on Aug. 6, 2024, which corresponds to Japanese Patent Application No. 2022-578428 and is related to U.S. Appl. No. 18/351,272; with English language translation.

An Office Action; "Notice of Reasons for Refusal," mailed by the Japanese Patent Office on May 22, 2024, which corresponds to Japanese Patent Application No. 2022-578428 and is related to U.S. Appl. No. 18/351,272; with English language translation.

An Office Action mailed by China National Intellectual Property Administration on Apr. 23, 2026, which corresponds to Chinese Patent Application No. 202280011848.7 and is related to U.S. Appl. No. 18/351,272; with English language translation.

* cited by examiner 10
216
212
30B
126a
140
142a
220
228
224
226
222
120
122
124
10B
20B
142b
126b
142c
126c
122A
218
130
10A
214
30A
20A
114
112
110
210
X
Y
Z 10
10A
10B
20A
20B
20b
30A
30B
18
18
110
112
114
120
122
124
126a
126b
126c
130
140
140
140
142a
142b
142c
300
302
302
302
306
306
306
X
Y
Z 10
110
112
114
30A
160
116a
162a
21
10A
20A
126c
23
140
142c
20B
10B
162c
160
22
116c
142a
140
126a
30B
116b
22
160
162b
130
120
122
124
142b
140
23
126b
X
Y
Z 30B
126a
140
142a
27
162b
116b
162c
116c
130
122
120
124
10B
20B
142b
140
126b
142c
140
126c
110
114
112
20A
10A
10
27
30A
116a
162a
X
Y
Z 10
110
112
114
120
124
122
126b
142b
30A
130
162b
160
116b
162a
160
116a
10A
20A
126c
142c
20B
10A
162c
160
116c
142a
126a
Y
Z
X 116b
166
162b
142a
146
126a
140
166
160
10A
10B
10
130
122
120
124
126b
146
20B
142b
140
112
110
114
20A
160
116a
166
162a
X
Z
Y 142a
146
126a
128
144
140
10B
162c
10A
30B
30A
130
142c
20B
10
114
110
112
160
20A
118
114
110
112
116a
166
162a
164
X
Z
Y

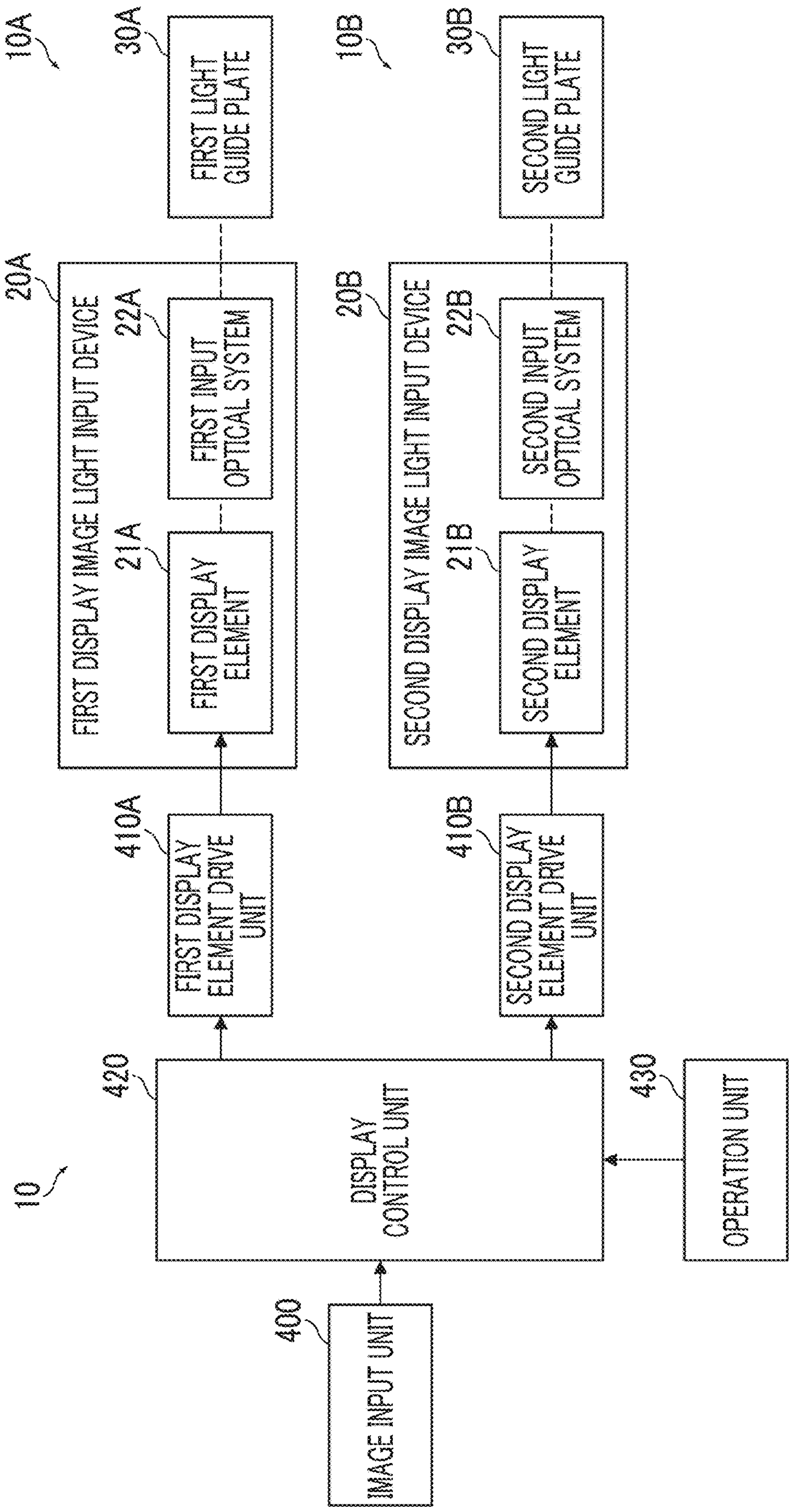

FIG. 29
10A
30A
FIRST LIGHT GUIDE PLATE
10B
30B
SECOND LIGHT GUIDE PLATE
20A
FIRST DISPLAY IMAGE LIGHT INPUT DEVICE
22A
FIRST INPUT OPTICAL SYSTEM
21A
FIRST DISPLAY ELEMENT
20B
SECOND DISPLAY IMAGE LIGHT INPUT DEVICE
22B
SECOND INPUT OPTICAL SYSTEM
21B
SECOND DISPLAY ELEMENT
410A
FIRST DISPLAY ELEMENT DRIVE UNIT
410B
SECOND DISPLAY ELEMENT DRIVE UNIT
420
DISPLAY CONTROL UNIT
10
430
OPERATION UNIT
400
IMAGE INPUT UNIT

IMAGE DISPLAY APPARATUS

CROSS-REFERENCE TO RELATED APPLICATIONS

The present application is a Continuation of PCT International Application No. PCT/JP2022/002757 filed on Jan. 26, 2022 claiming priority under 35 U.S.C § 119(a) to Japanese Patent Application No. 2021-013413 filed on Jan. 29, 2021. Each of the above applications is hereby expressly incorporated by reference, in its entirety, into the present application.

BACKGROUND OF THE INVENTION

1. Field of the Invention

The present invention relates to an image display apparatus, and particularly to an image display apparatus used in front of an eye.

2. Description of the Related Art

In JP2011-164545A, JP2001-264683A, and JP2014-41280A, the technology is disclosed in which, in a head mount type image display apparatus, a plurality of display elements are used, an image displayed on each display element is individually guided to a pupil of an observer, and the observer is allowed to observe one composite image.

SUMMARY OF THE INVENTION

One embodiment according to the technology of the present disclosure provides an image display apparatus that can observe a high-quality image.

(1) An image display apparatus comprising a plurality of display image light input devices that input display image light, a plurality of light guide plates that are disposed in a superimposed manner, receive input of the display image light individually from the plurality of display image light input devices, and propagate the input display image light to an output surface while individually reflecting the input display image light, and a first adjustment mechanism that adjusts a disposition relationship between the plurality of light guide plates.

(2) The image display apparatus according to (1), in which the first adjustment mechanism relatively adjusts an inclination and/or a position between the plurality of light guide plates.

(3) The image display apparatus according to (1) or (2), in which the first adjustment mechanism includes a holding member that holds the plurality of light guide plates in a superimposed manner, and individually adjusts a disposition relationship of the plurality of light guide plates with respect to the holding member.

(4) The image display apparatus according to (3), in which the holding member holds the light guide plate at a plurality of holding points set in the same plane, and the first adjustment mechanism individually adjusts an interval between the light guide plate and the holding member at each holding point, and individually adjusts the disposition relationship of the plurality of light guide plates with respect to the holding member.

(5) The image display apparatus according to (4), in which the first adjustment mechanism includes a fastening member that fastens the light guide plate and the holding member at each holding point, and a biasing member that biases the light guide plate and the holding member in a direction in which the light guide plate and the holding member are spaced from each other, at each holding point.

(6) The image display apparatus according to (4), in which the first adjustment mechanism includes a fastening member that fastens the light guide plate and the holding member at each holding point, and a spacer member that is disposed between the light guide plate and the holding member at each holding point.

(7) The image display apparatus according to any one of (3) to (6), in which the plurality of light guide plates are disposed in a superimposed manner on one side of the holding member, and are held by the holding member.

(8) The image display apparatus according to any one of (3) to (6), in which the holding member is disposed between the respective superimposed light guide plates, and the plurality of light guide plates are held by the holding member.

(9) The image display apparatus according to (1) or (2), in which the first adjustment mechanism includes a spacer member that is inserted between the plurality of light guide plates, and adjusts a relative disposition relationship between the plurality of light guide plates by adjusting a position and/or a thickness for inserting the spacer member.

(10) The image display apparatus according to any one of (1) to (9), in which the display image light input device is assembled to the light guide plate, and the light guide plate and the display image light input device are moved together in a case of adjustment via the first adjustment mechanism.

(11) The image display apparatus according to any one of (1) to (9), in which the light guide plate is moved independently of the display image light input device in a case of adjustment via the first adjustment mechanism.

(12) The image display apparatus according to any one of (1) to (9), further comprising a plurality of second adjustment mechanisms that individually adjust a relative disposition relationship between each light guide plate and the display image light input device.

(13) The image display apparatus according to (12), in which the second adjustment mechanism relatively adjusts an inclination and/or a position between the light guide plate and the display image light input device.

(14) The image display apparatus according to any one of (1) to (13), further comprising a processor, in which the processor receives an instruction for adjustment of a position at which the display image light input device inputs the display image light to the light guide plate, and adjusts the position at which the display image light input device inputs the display image light to the light guide plate, in response to the received instruction for adjustment.

(15) An image display apparatus comprising a plurality of display image light input devices that input display image light, a plurality of light guide plates that are disposed in a superimposed manner, receive input of the display image light individually from the plurality of display image light input devices, and propagate the input display image light to an output surface while individually reflecting the input display image light, and a plurality of third adjustment mechanisms that individually adjust a disposition relationship between each light guide plate and the display image light input device.

(16) The image display apparatus according to (15), in which the third adjustment mechanism relatively adjusts an inclination and/or a position between the light guide plate and the display image light input device.

(17) The image display apparatus according to (15) or (16), further comprising a processor, in which the processor receives an instruction for adjustment of a position at which the display image light input device inputs the display image light to the light guide plate, and adjusts the position at which the display image light input device inputs the display image light to the light guide plate, in response to the received instruction for adjustment.

(18) An image display apparatus comprising a plurality of display image light input devices that input display image light, a plurality of light guide plates that are disposed in a superimposed manner, receive input of the display image light individually from the plurality of display image light input devices, and propagate the input display image light to an output surface while individually reflecting the input display image light, and a processor, in which the processor receives an instruction for adjustment of a position at which the display image light input device inputs the display image light to the light guide plate, and adjusts the position at which the display image light input device inputs the display image light to the light guide plate, in response to the received instruction for adjustment.

BRIEF DESCRIPTION OF THE DRAWINGS

FIG. 29 is a block diagram showing an electrical configuration of the image display unit.

DESCRIPTION OF THE PREFERRED EMBODIMENTS

Hereinafter, preferred embodiments of the present invention will be described in detail with reference to the accompanying drawings.

First Embodiment

Here, as an example, a case will be described in which the present invention is applied to a head mount type image display apparatus.

Figure 1:
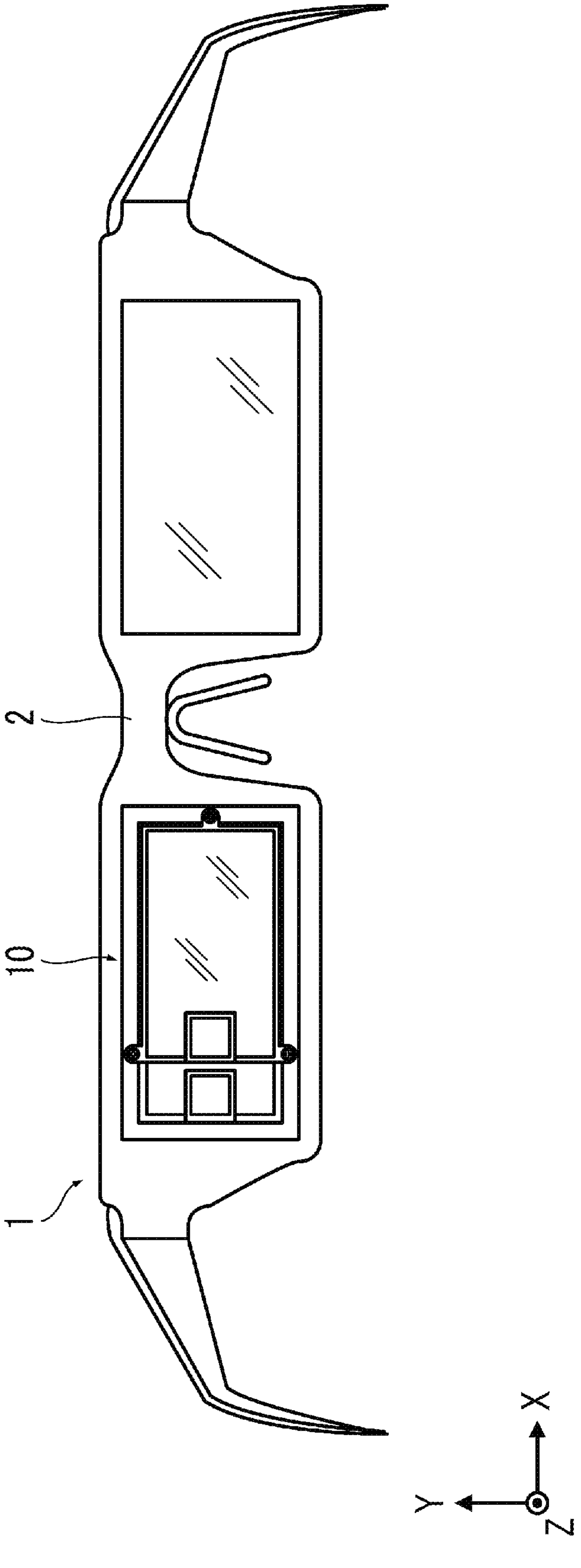
FIG. 1 is a diagram showing an example of a head mount type image display apparatus.

FIG. 1 is a diagram showing an example of the head mount type image display apparatus.

FIG. 1 shows an example of a so-called eyeglass-type head mount type image display apparatus 1. The eyeglass-type head mount type image display apparatus 1 is an image display apparatus having a so-called eyeglass-like shape, and a lens portion of ordinary eyeglasses is configured as an image display portion. FIG. 1 shows an example in which one lens portion (lens portion on a left eye side) of two lens portions is configured as the image display portion. In this case, an image display unit 10 is incorporated into the lens portion on one side of a frame 2 that constitutes the eyeglasses. The image display unit 10 is an example of an image display apparatus.

[Image Display Unit]

Figure 2:
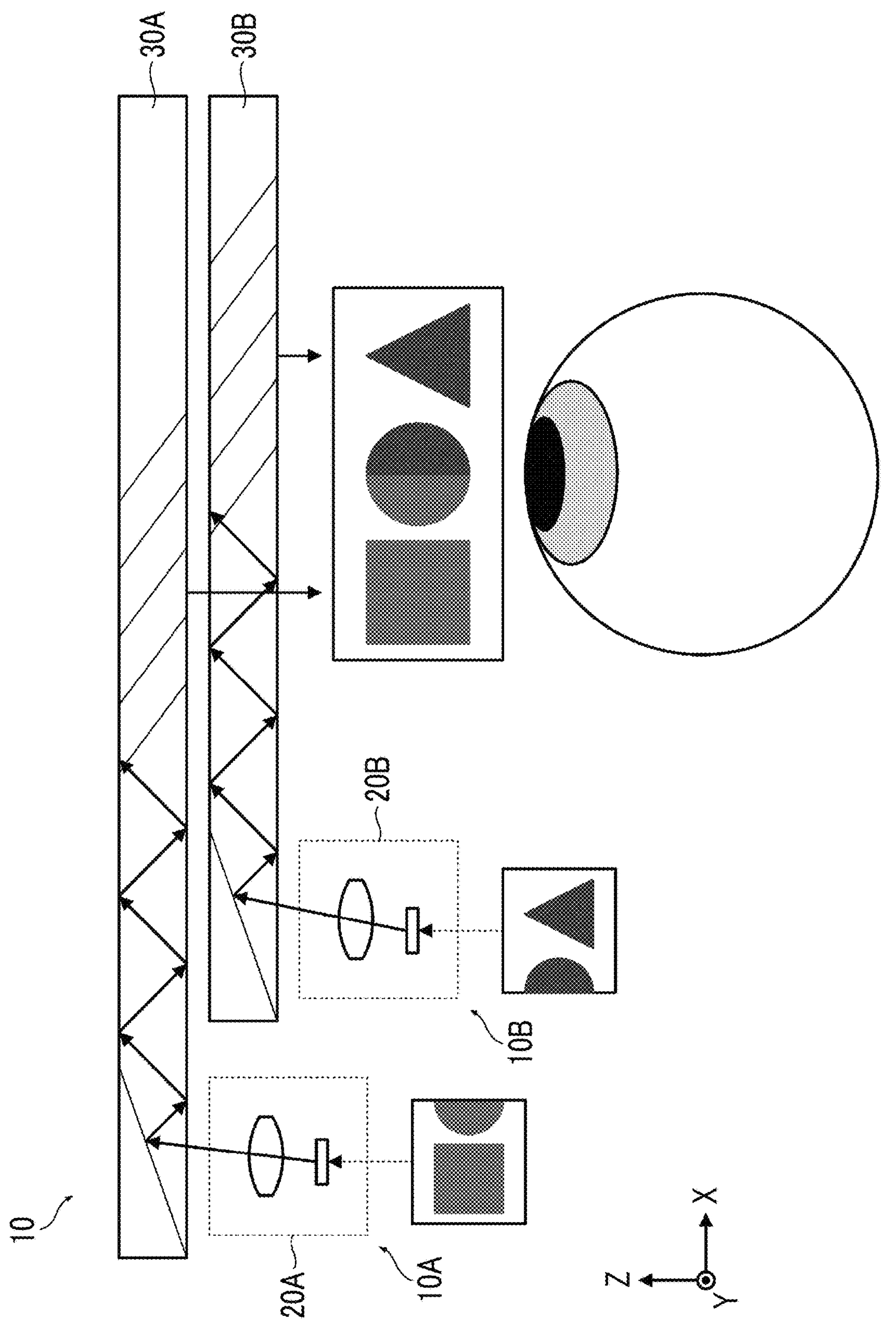
FIG. 2 is a diagram showing a schematic configuration of an image display unit.

FIG. 2 is a diagram showing a schematic configuration of the image display unit.

As shown in FIG. 2, the image display unit 10 according to the present embodiment is configured by combining a first unit 10A and a second unit 10B. Each of the first unit 10A and the second unit 10B has a function of displaying an image individually. That is, the image display unit 10 according to the present embodiment uses two units, each of which has the function of displaying the image individually, in combination, and allows an observer to observe a composite image, thereby enlarging a range of the image that can be observed by the observer.

[Configuration of Display Unit]

First, configurations of the two units constituting the image display unit 10 will be described.

[First Unit]

Figure 3:
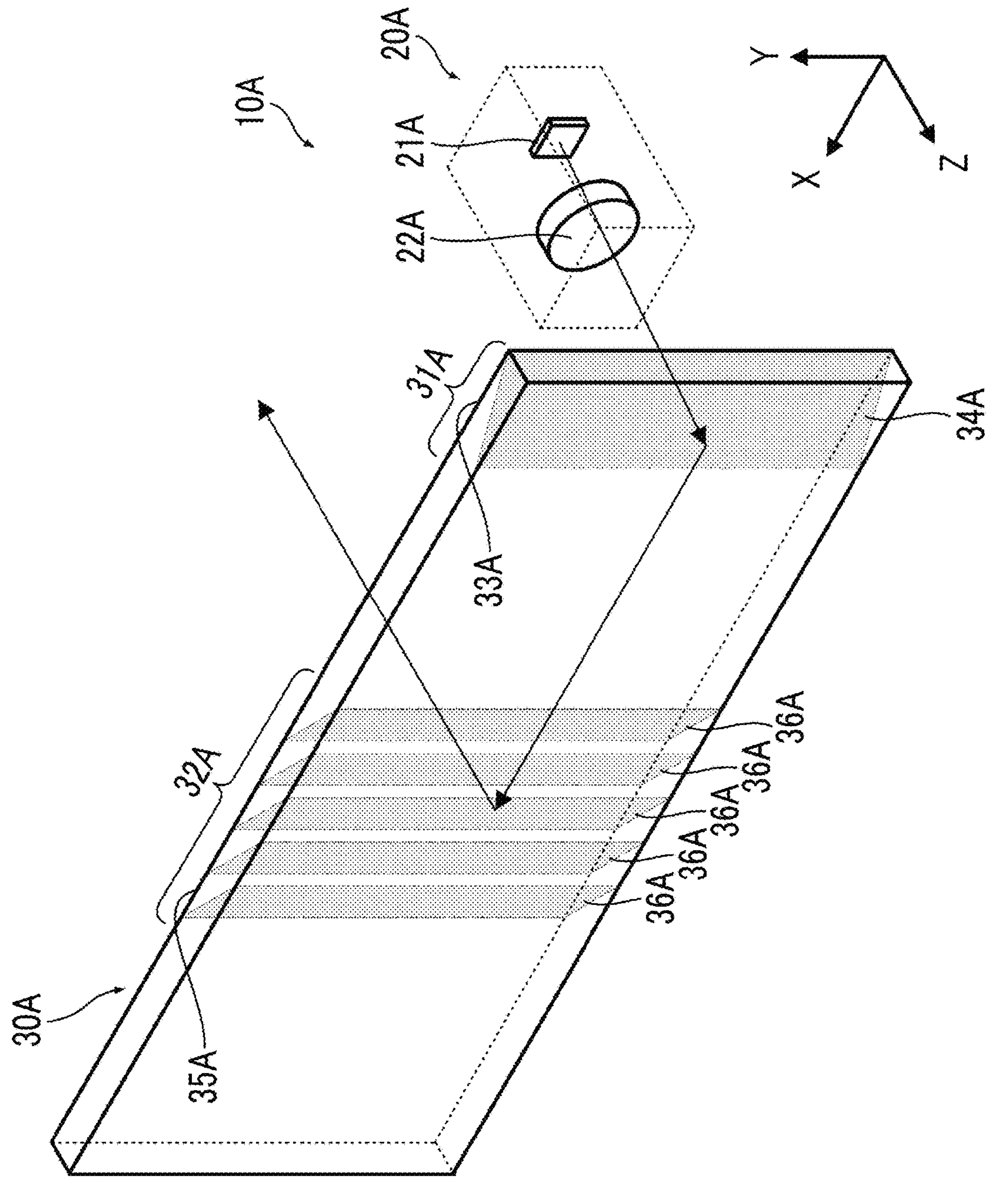
FIG. 3 is a perspective view showing a schematic configuration of a first unit.
Figure 4:
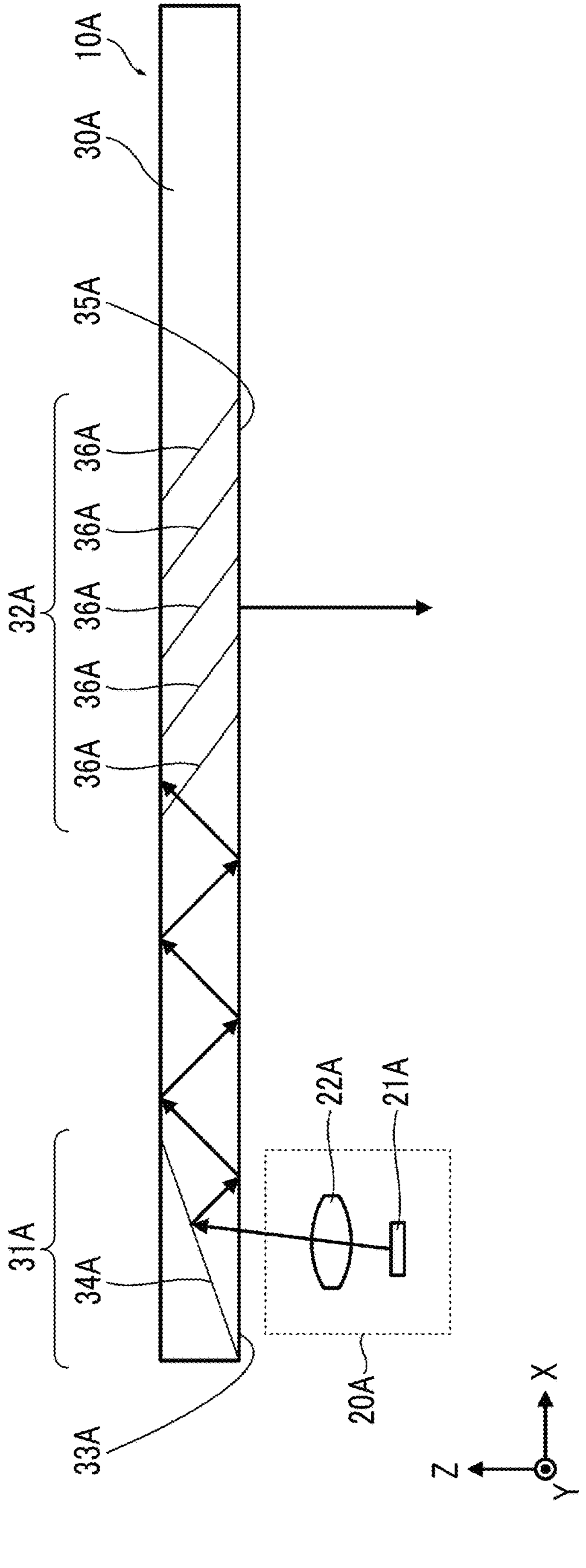
FIG. 4 is a front view showing a schematic configuration of the first unit.
Figure 5:
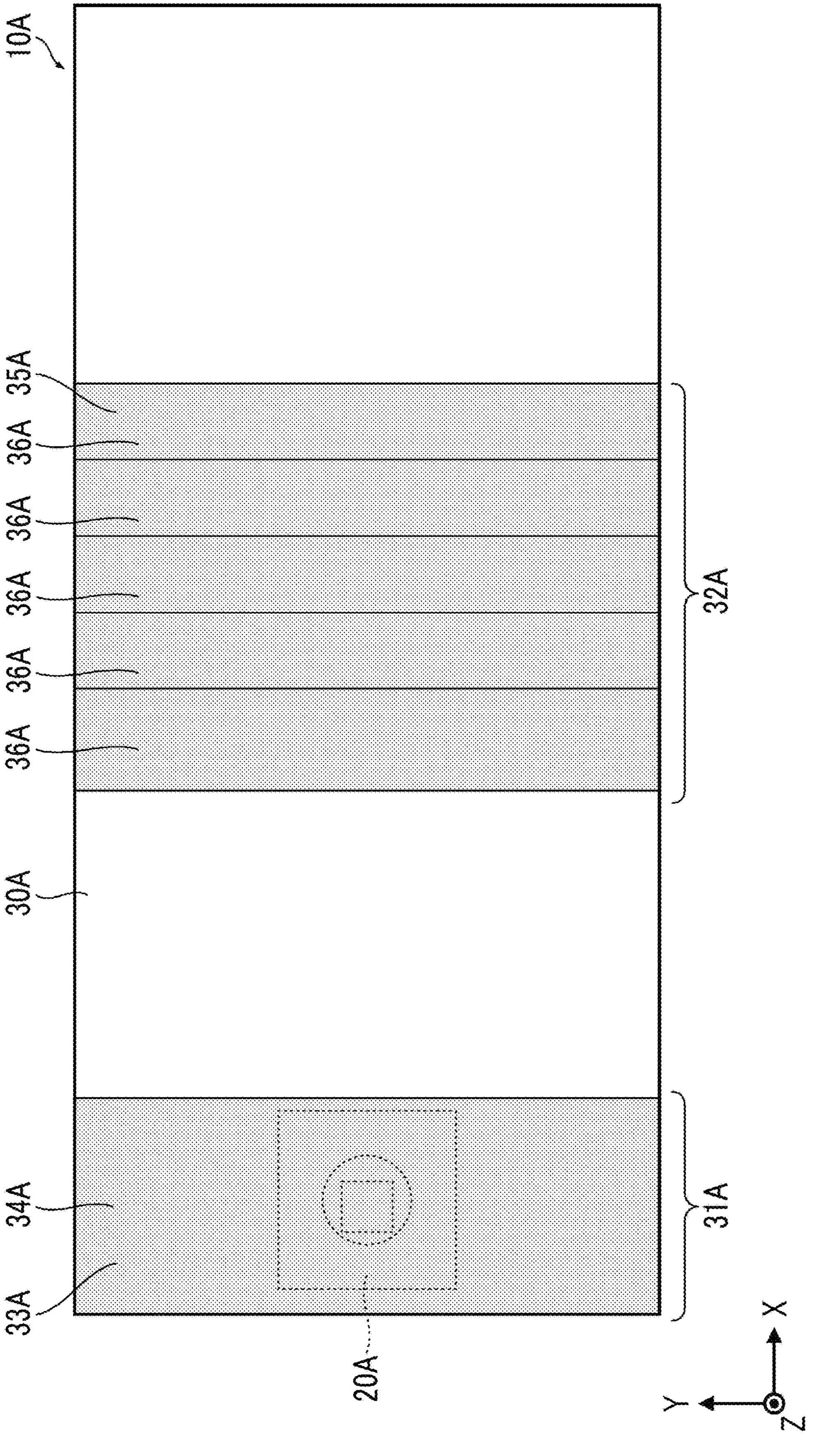
FIG. 5 is a top view showing a schematic configuration of the first unit.
Figure 6:
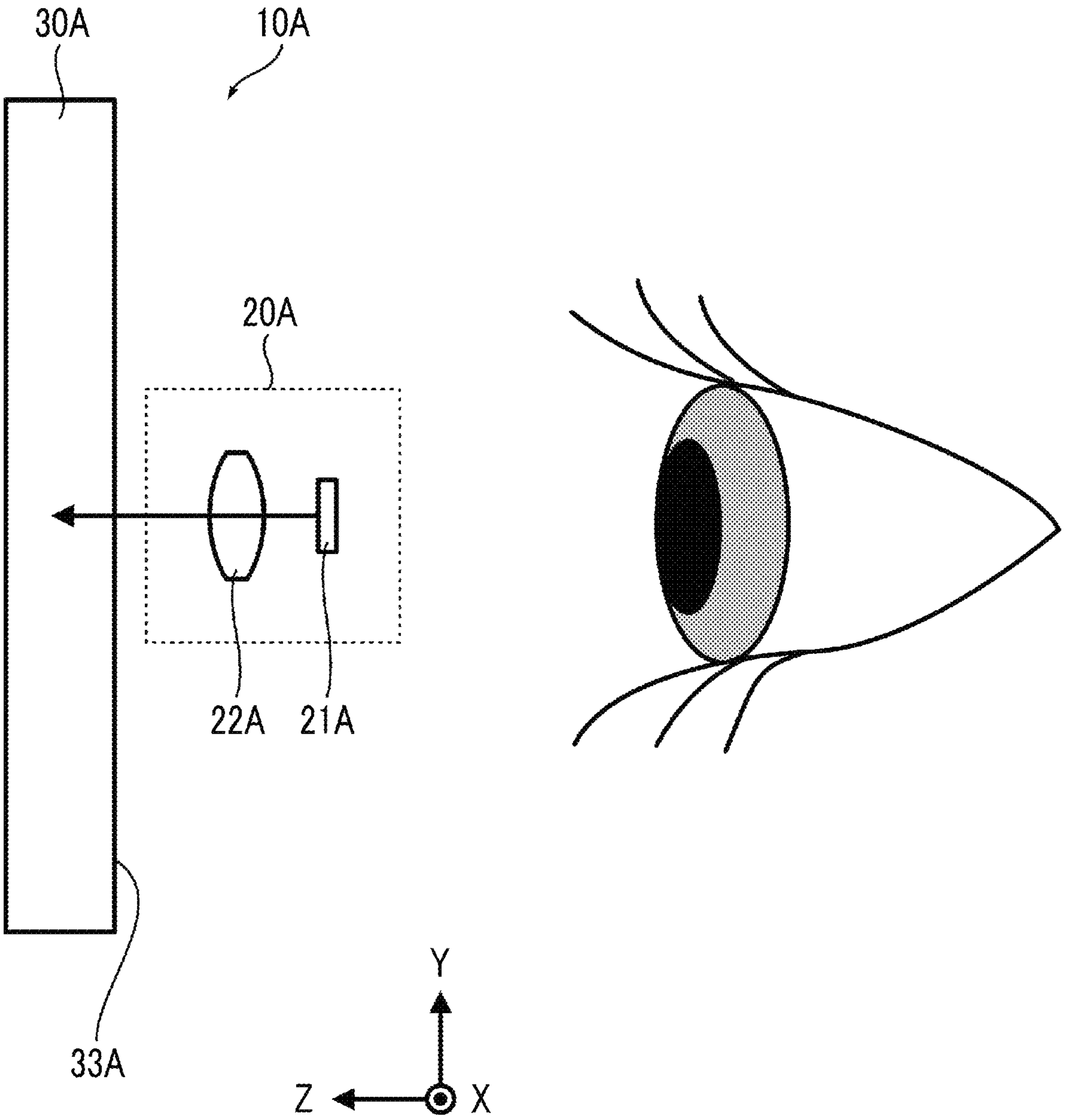
FIG. 6 is a side view showing a schematic configuration of the first unit.

FIG. 3 is a perspective view showing a schematic configuration of the first unit. FIG. 4 is a front view showing a schematic configuration of the first unit. It should be noted that a front surface here is a surface facing the observer's eye in a case in which the observer observes the image. FIG. 5 is a top view showing a schematic configuration of the first unit. FIG. 6 is a side view showing a schematic configuration of the first unit. It should be noted that, in each figure, a long side direction of a light guide plate is defined as an X axis direction, a short side direction is defined as a Y axis direction, and a thickness direction is defined as a Z axis direction. The X axis direction is a lateral direction (left-right direction) in a case of observing the image, and the Y axis direction is a vertical direction (up-down direction) in a case of observing the image. In addition, the Z axis direction is a depth direction (front-back direction) in a case of observing the image.

The first unit 10A includes a first display image light input device 20A and a first light guide plate 30A.

The first display image light input device 20A mainly includes a first display element 21A and a first input optical system 22A.

The first display element 21A is composed of, for example, a liquid crystal panel and an organic electro-luminescence (OEL) panel. Light emitted from each point of the first display element 21A constitutes display image light.

The first input optical system 22A is a so-called collimating lens, and makes the light emitted from each point of the first display element 21A into a luminous flux in a parallel state.

The first display image light input device 20A causes the display image light to be incident on the first light guide plate 30A at a predetermined incidence angle.

The first light guide plate 30A internally reflects the display image light input from the first display image light input device 20A a plurality of times, and guides the display image light to a pupil of the observer. As shown in FIG. 3, the first light guide plate 30A has a rectangular parallel plate-like shape as a whole. The first light guide plate 30A has translucency, and is configured to recognize the surrounding real space through the first light guide plate 30A.

The first light guide plate 30A includes a first input portion 31A to which the display image light from the first display image light input device 20A is input and a first output portion 32A that outputs the display image light toward the pupil.

The first input portion 31A is provided at an end portion on one side in the lateral direction of the first light guide plate 30A. In the first input portion 31A, a front side surface (surface facing the observer's eye) of the first light guide plate 30A is configured as a first input surface 33A for the display image light. The first input portion 31A comprises a mirror 34A. The mirror 34A reflects the display image light input to the first input surface 33A in a predetermined direction.

As shown in FIG. 4, the display image light reflected by the mirror 34A travels along the lateral direction (X axis direction) while being reflected inside the first light guide plate 30A, and is output from the first output portion 32A.

In the first output portion 32A, a front side surface of the first light guide plate 30A is configured as a first output surface 35A for the display image light. The first output portion 32A comprises a plurality of half mirrors 36A. The half mirrors 36A are disposed at predetermined intervals. The display image light propagated while being reflected inside the first light guide plate 30A is reflected in a predetermined direction by the plurality of half mirrors 36A, and is output from the first output surface 35A. The display image light output from the first output surface 35A is incident on the pupil of the observer, so that the image represented by the display image light is observed by the observer.

[Second Unit]

Figure 7:
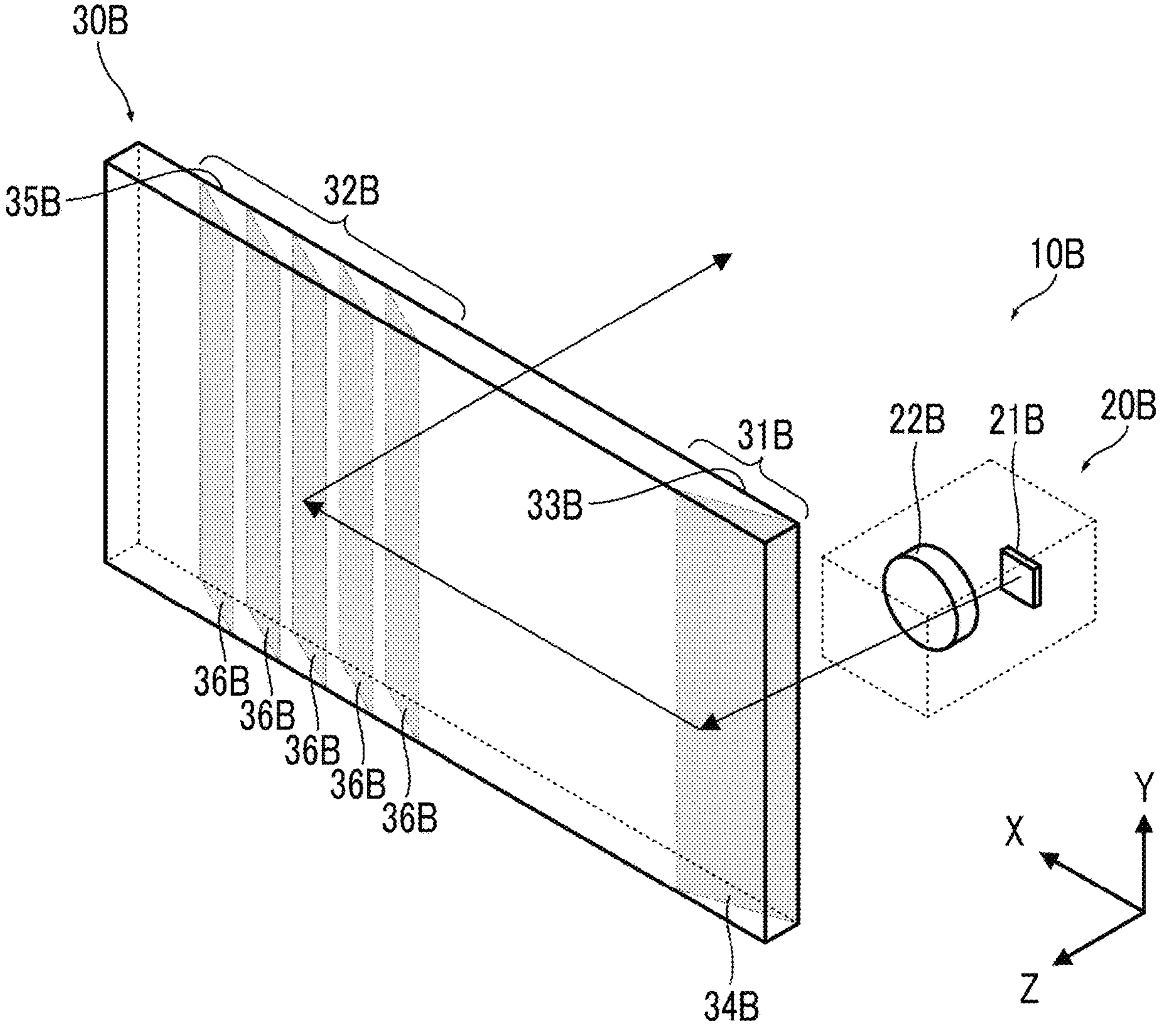
FIG. 7 is a perspective view showing a schematic configuration of a second unit.

FIG. 7 is a perspective view showing a schematic configuration of the second unit. The basic configuration is the same as the basic configuration of the first unit 10A.

The second display image light input device 20B mainly includes a second display element 21B and a second input optical system 22B.

The second display element 21B is composed of, for example, a liquid crystal panel and an organic EL panel. Light emitted from each point of the second display element 21B constitutes the display image light.

The second input optical system 22B is a so-called collimating lens, and makes the light emitted from each point of the second display element 21B into a luminous flux in a parallel state.

The second display image light input device 20B causes the display image light to be incident on the second light guide plate 30B at a predetermined incidence angle.

The second light guide plate 30B internally reflects the display image light input from the second display image light input device 20B a plurality of times, and guides the di splay image light to the pupil of the observer. The second light guide plate 30B has a rectangular parallel plate-like shape as a whole. The second light guide plate 30B has translucency, and is configured to recognize the surrounding real space through the second light guide plate 30B.

The second light guide plate 30B includes a second input portion 31B to which the display image light from the second display image light input device 20B is input and a second output portion 32B that outputs the display image light toward the pupil.

The second input portion 31B is provided at an end portion on one side in the lateral direction of the second light guide plate 30B. In the second input portion 31B, a front side surface of the second light guide plate 30B is configured as a second input surface 33B for the display image light. The second input portion 31B comprises a mirror 34B. The mirror 34B reflects the display image light input to the second input surface 33B in a predetermined direction.

The display image light reflected by the mirror 34B travels along the lateral direction (X axis direction) while being reflected inside the second light guide plate 30B, and is output from the second output portion 32B.

In the second output portion 32B, a front side surface of the second light guide plate 30B is configured as a second output surface 35B for the display image light. The second output portion 32B comprises a plurality of half mirrors 36B. The half mirrors 36B are disposed at predetermined intervals. The display image light propagated while being reflected inside the second light guide plate 30B is reflected in a predetermined direction by the plurality of half mirrors 36B, and is output from the second output surface 35B. The display image light output from the second output surface 35B is incident on the pupil of the observer, so that the image represented by the display image light is observed by the observer.

It should be noted that the first light guide plate 30A and the second light guide plate 30B have the same dimensions in the vertical direction (Y axis direction) but have the different dimensions in the lateral direction (X axis direction). As shown in FIG. 2, the dimensions of the second light guide plate 30B in the lateral direction is set to be shorter than the dimensions of the first light guide plate 30A. This configuration is to align the positions of both end portions during assembly.

[Configuration of Image Display Unit]

As described above, the image display unit 10 is configured by combining the two units. Specifically, the first unit 10A and the second unit 10B are disposed in a superimposed manner in a predetermined disposition relationship. This disposition relationship is a disposition relationship in which the images displayed in the respective units are combined and observed as one image. More specifically, the disposition relationship is a disposition relationship in which the images displayed by the respective units are connected in the lateral direction (X axis direction) and observed as one image. This disposition relationship is a so-called disposition relationship in which panoramic composition is performed in the lateral direction.

In the image display unit 10 according to the present embodiment, as shown in FIG. 2, a relationship is set in which the images displayed by the respective units are combined and observed in a case in which the second unit 10B is disposed in a superimposed manner at a predetermined position on the front side of the first unit 10A. In particular, in the image display unit 10 according to the present embodiment, a relationship is set in which the images displayed by the respective units are combined and observed in a case in which the ends of the light guide plates of the respective units are aligned and disposed. It should be noted that the front side here means a side close to the observer's eye in the depth direction (Z axis direction). In addition, the aligned end portions are end portions on the output portion side of the light guide plates of the respective units. In addition, the respective units are superimposed in parallel on each other by matching the heights of the light guide plates.

It should be noted that, as a premise, it is necessary that the display image light is set to be input to the light guide plate at the predetermined incidence angle in each unit. The incidence angle of the display image light set in each unit is an angle at which the images displayed in the respective units are combined and observed in a case in which the two units are disposed in a superimposed manner in the predetermined disposition relationship.

[Adjustment Mechanism of Image Display Unit]

As described above, in the image display unit 10, by disposing the two units in the predetermined disposition relationship, the images displayed by the respective units are combined and observed as one image. On the other hand, in a case in which the two units are not disposed in the predetermined disposition relationship, a seam appears in the image to be observed, and the quality is significantly deteriorated. However, it is difficult to accurately assemble the two units in the predetermined disposition relationship. Also, high component accuracy is required for accurate assembly. Therefore, the image display unit 10 according to the present embodiment comprises a mechanism (adjustment mechanism) that adjusts the disposition relationship between the two units.

Figure 8:
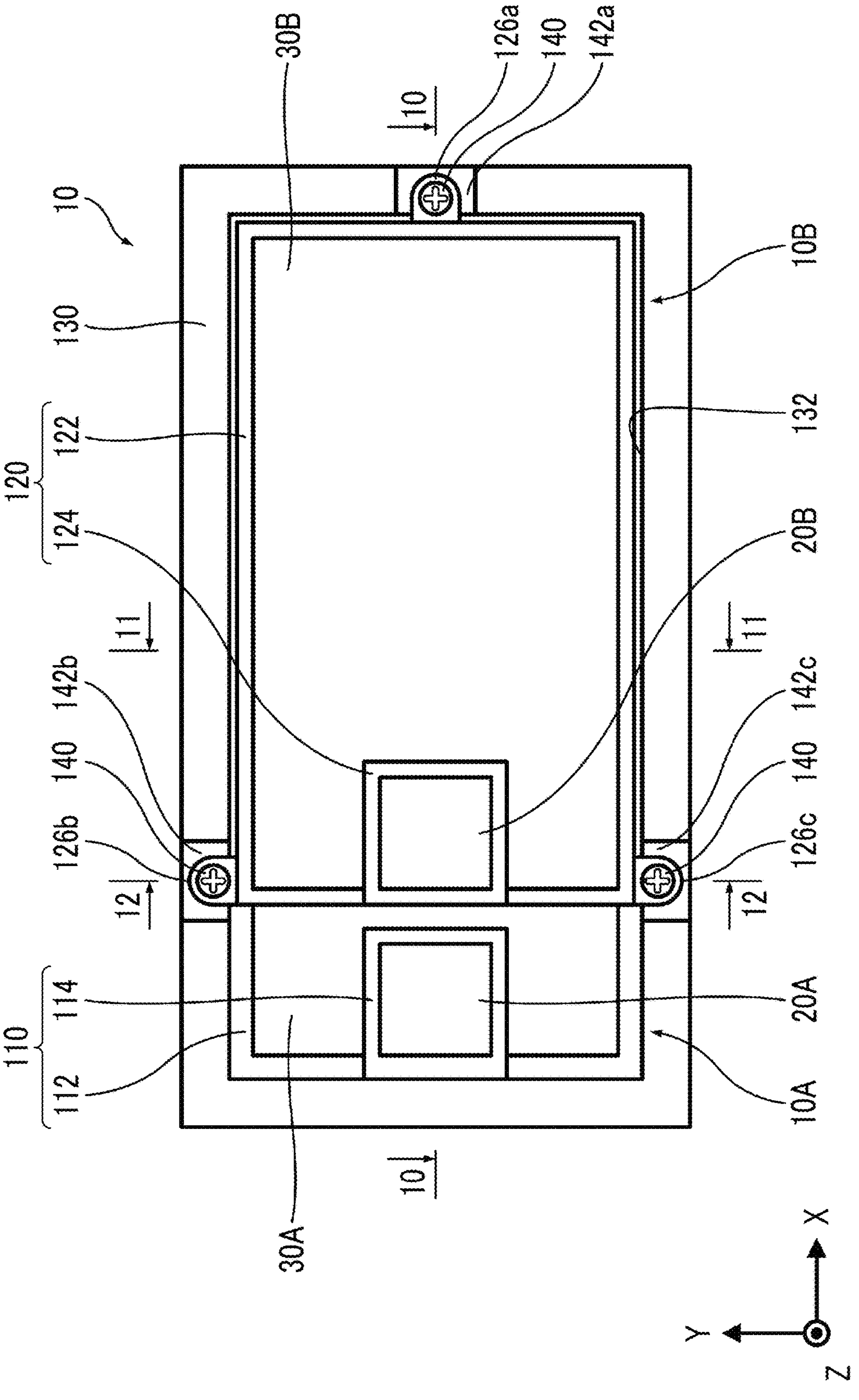
FIG. 8 is a front view showing a schematic configuration of an entire image display unit including an adjustment mechanism.
Figure 9:
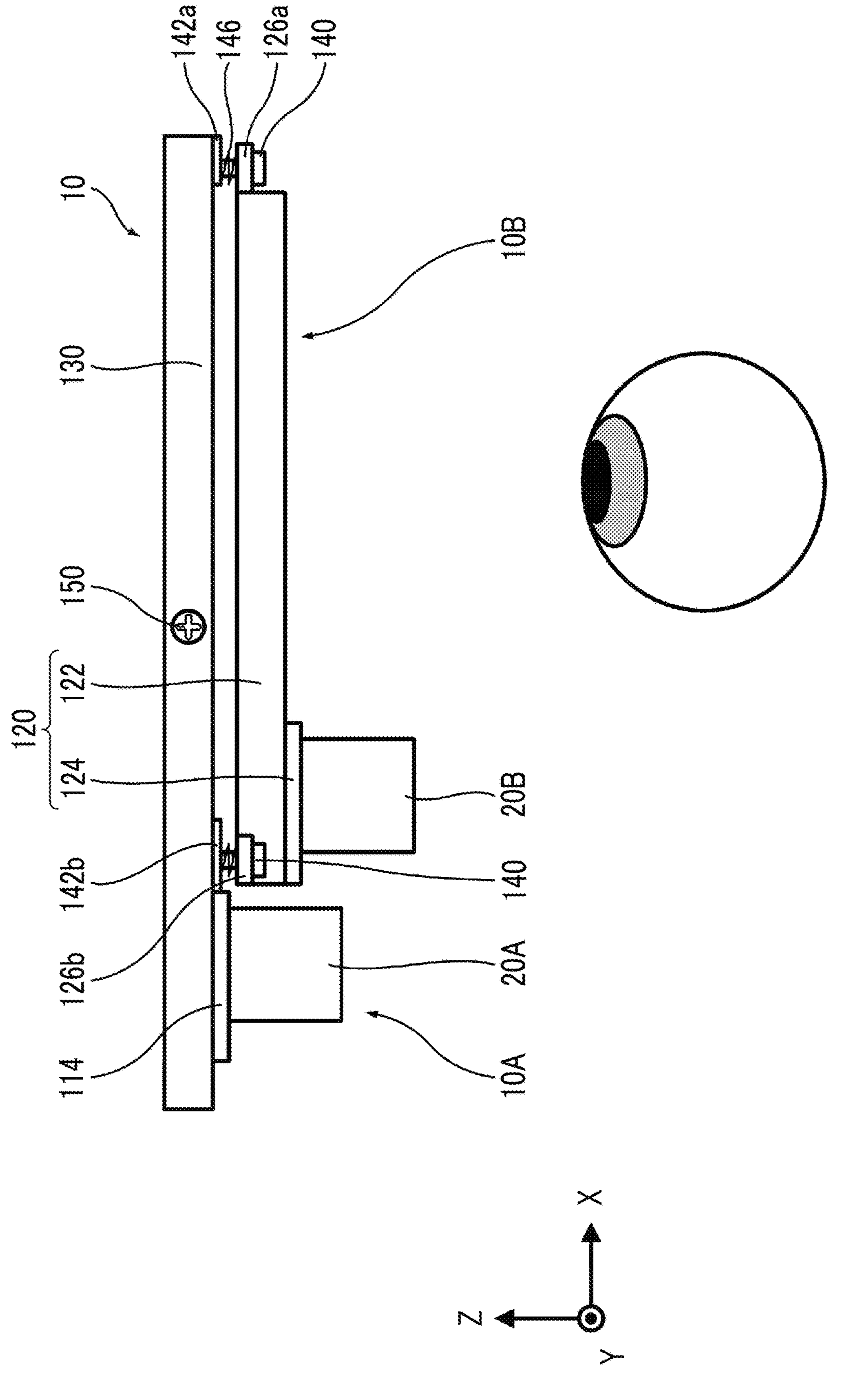
FIG. 9 is a top view of the image display unit shown in FIG. 8.
Figure 10:
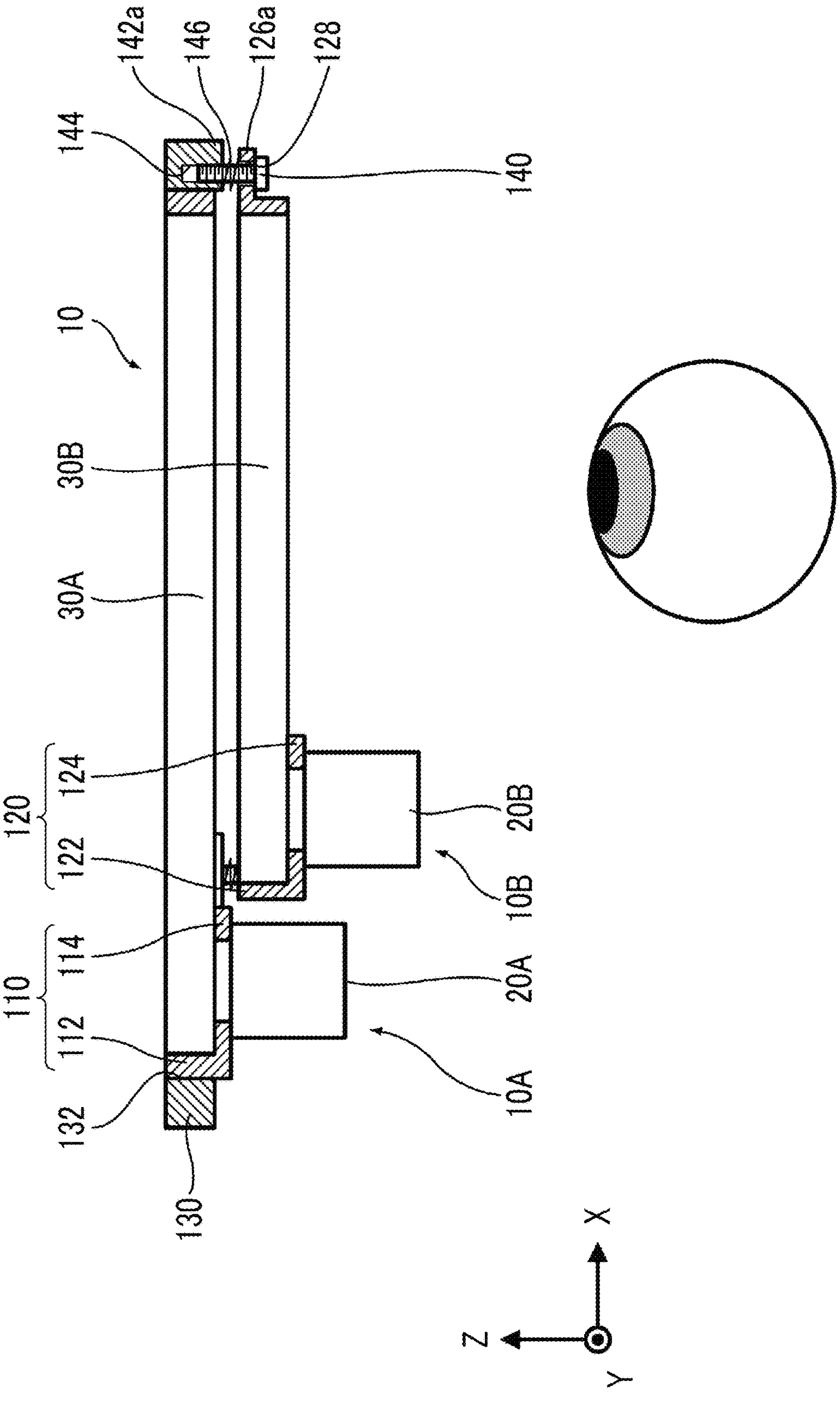
FIG. 10 is a cross-sectional view taken along a line 10-10 of FIG. 8.
Figure 11:
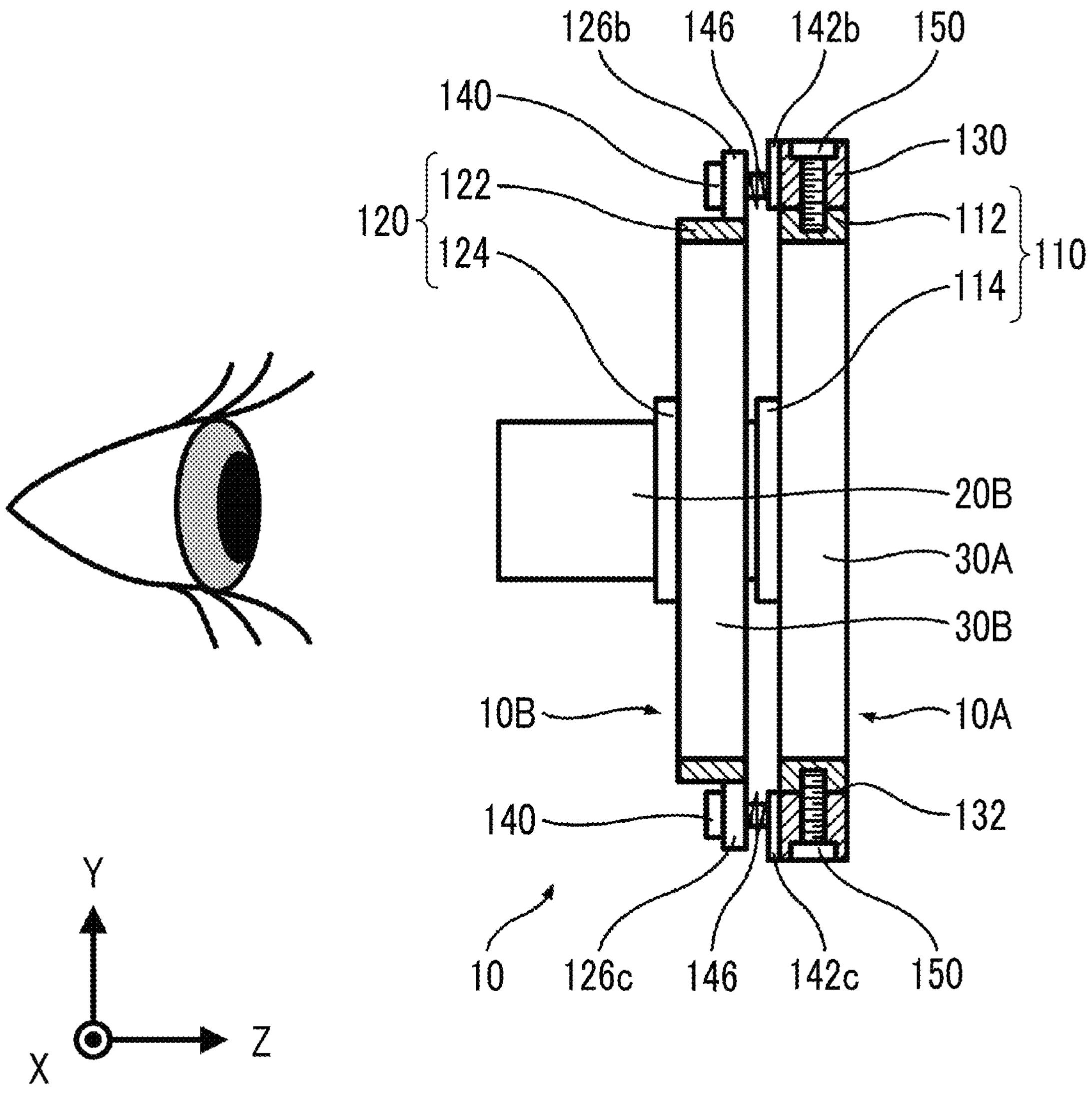
FIG. 11 is a cross-sectional view taken along a line 11-11 of FIG. 8.
Figure 12:
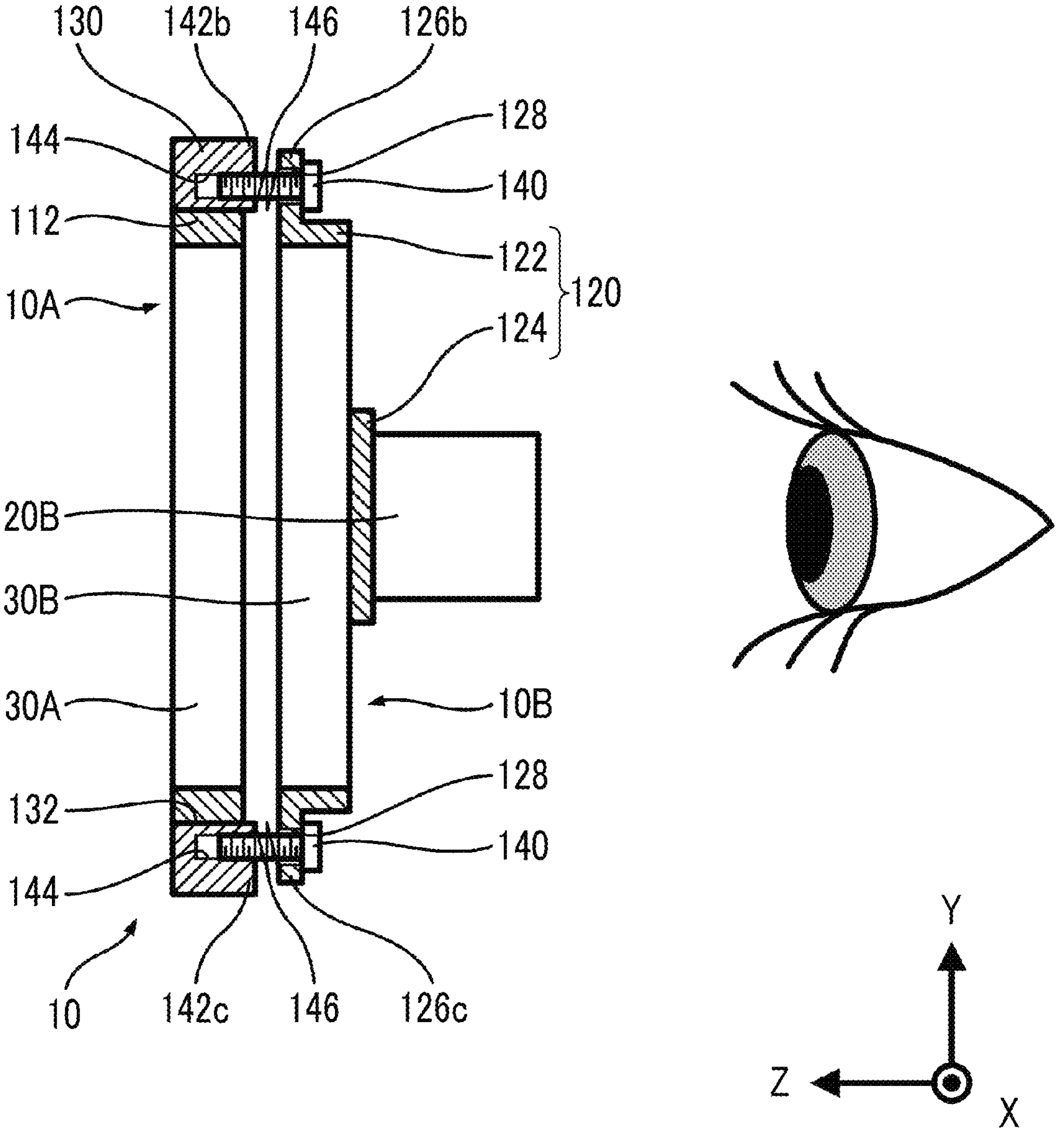
FIG. 12 is a cross-sectional view taken along a line 12-12 of FIG. 8.

FIG. 8 is a front view showing a schematic configuration of the entire image display unit including the adjustment mechanism. FIG. 9 is a top view of the image display unit shown in FIG. 8. FIG. 10 is a cross-sectional view taken along a line 10-10 of FIG. 8. FIG. 11 is a cross-sectional view taken along a line 11-11 of FIG. 8. FIG. 12 is a cross-sectional view taken along a line 12-12 of FIG. 8.

The first unit 10A is unitized by attaching the first display image light input device 20A and the first light guide plate 30A to a first frame 110.

The first frame 110 is composed of a first frame body 112, and a first display image light input device attachment portion 114 integrally provided in the first frame body 112.

The first frame body 112 is a holding portion of the first light guide plate 30A, and has a rectangular frame-like shape. The first light guide plate 30A is held on an inner peripheral portion of the first frame body 112.

The first display image light input device attachment portion 114 is an attachment portion of the first display image light input device 20A. The first display image light input device 20A is attached to the first display image light input device attachment portion 114 to be positioned and attached at a predetermined position.

The second unit 10B is unitized as one unit by attaching the second display image light input device 20B and the second light guide plate 30B to a second frame 120.

The second frame 120 is mainly composed of a second frame body 122, and a second display image light input device attachment portion 124 integrally provided in the second frame body 122.

The second frame body 122 is a holding portion of the second light guide plate 30B, and has a rectangular frame-like shape. The second light guide plate 30B is held on an inner peripheral portion of the second frame body 122.

The second display image light input device attachment portion 124 is an attachment portion of the second display image light input device 20B. The second display image light input device 20B is attached to the second display image light input device attachment portion 124 to be positioned and attached at a predetermined position with respect to the second light guide plate 30B.

The first unit 10A and the second unit 10B are attached to a base frame 130, and are integrated with each other. The base frame 130 is an example of a holding member. As shown in FIG. 8, the base frame 130 has a rectangular frame-like shape.

In the image display unit 10 according to the present embodiment, an inner peripheral portion 132 of the base frame 130 functions as a holding portion of the first unit 10A. By fitting the first frame body 112 into the inner peripheral portion 132 of the base frame 130, the first unit 10A is attached to the base frame 130. Therefore, the inner peripheral portion 132 of the base frame 130 has a shape corresponding to the shape of an outer periphery of the first frame body 112. The first frame body 112 fitted to the inner peripheral portion 132 is fixed to the base frame 130 at a plurality of locations by being screwed with first unit fixing screws 150 (see FIGS. 9 and 11). As a result, the first unit 10A and the base frame 130 are integrated with each other.

The second unit 10B is attached to the base frame 130 by using a second unit inclination adjusting screw 140. The second unit inclination adjusting screw 140 is an example of a fastening member.

As shown in FIG. 8, the second frame body 122 comprises second frame screwing portions 126*a*, 126*b*, and 126*c* at three locations on an outer peripheral portion. The disposition of the three second frame screwing portions 126*a*, 126*b*, and 126*c* is as follows. That is, the second frame screwing portion 126*a* indicated by the reference numeral 126*a* is provided at the center of the right side of the second frame body 122 in FIG. 8. The second frame screwing portion 126*b* indicated by the reference numeral 126*b* is provided at the left end of the upper side of the second frame body 122 in FIG. 8. The second frame screwing portion 126*c* indicated by the reference numeral 126*c* is provided at the left end of the lower side of the second frame body 122 in FIG. 8.

Each of the second frame screwing portions 126*a*, 126*b*, and 126*c* comprises a hole 128 through which the second unit inclination adjusting screw 140 is passed. Each hole 128 has an inner diameter φ2 which is larger than an outer diameter φ1 of the second unit inclination adjusting screw 140 (φ 1<φ2). That is, each hole 128 has a relationship that creates a gap (so-called "clearance") between the hole 128 and the second unit inclination adjusting screw 140 in a case in which the second unit inclination adjusting screw 140 is passed through the hole 128.

Figure 13:
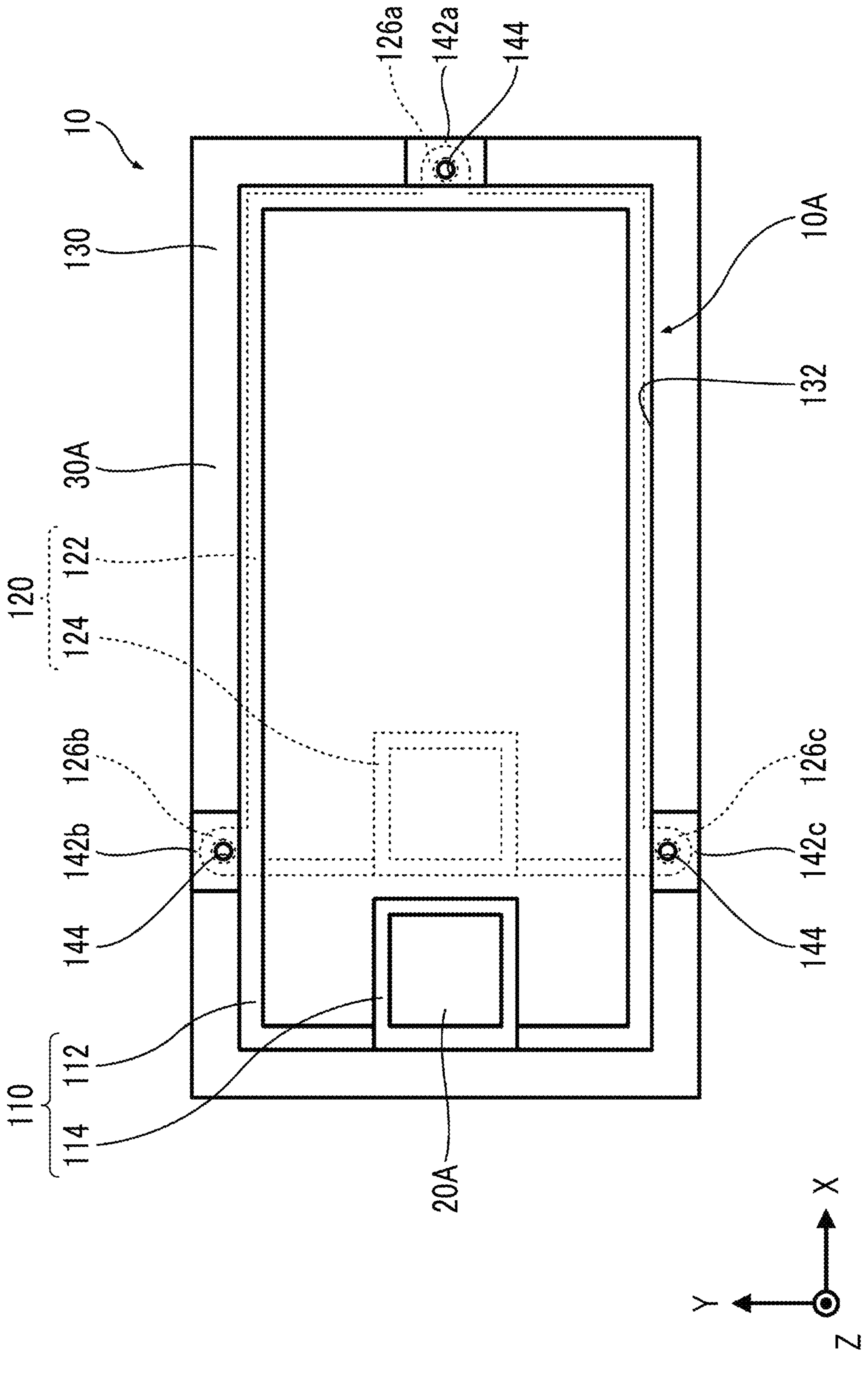
FIG. 13 is a front view of the image display unit in a state in which the second unit is removed.

FIG. 13 is a front view of the image display unit in a state in which the second unit is removed.

As shown in FIG. 13, the base frame 130 comprises second unit attachment portions 142*a*, 142*b*, and 142*c* at three locations on the front side surface. The second unit attachment portions 142*a*, 142*b*, and 142*c* are each composed of a columnar protrusion portion, and are disposed on the same plane. The disposition of the second unit attachment portions 142*a*, 142*b*, and 142*c* is the same as the disposition of the three second frame screwing portions 126*a*, 126*b*, and 126*c* provided in the second frame body 122.

Each of the second unit attachment portions 142*a*, 142*b*, and 142*c* comprises a screw hole 144. The screw hole 144 is disposed at the center of the top of each of the second unit attachment portions 142*a*, 142*b*, and 142*c*. In addition, the screw hole 144 has dimensions corresponding to the second unit inclination adjusting screw 140, and is disposed along the depth direction (Z axis direction).

The second unit 10B is attached to the base frame 130 by passing the second unit inclination adjusting screw 140 through the hole 128 of each of the second frame screwing portions 126*a*, 126*b*, and 126*c*, and fitting the second unit inclination adjusting screw 140 into the screw hole 144 of each of the second unit attachment portions 142*a*, 142*b*, and 142*c* of the base frame 130.

Figure 14:
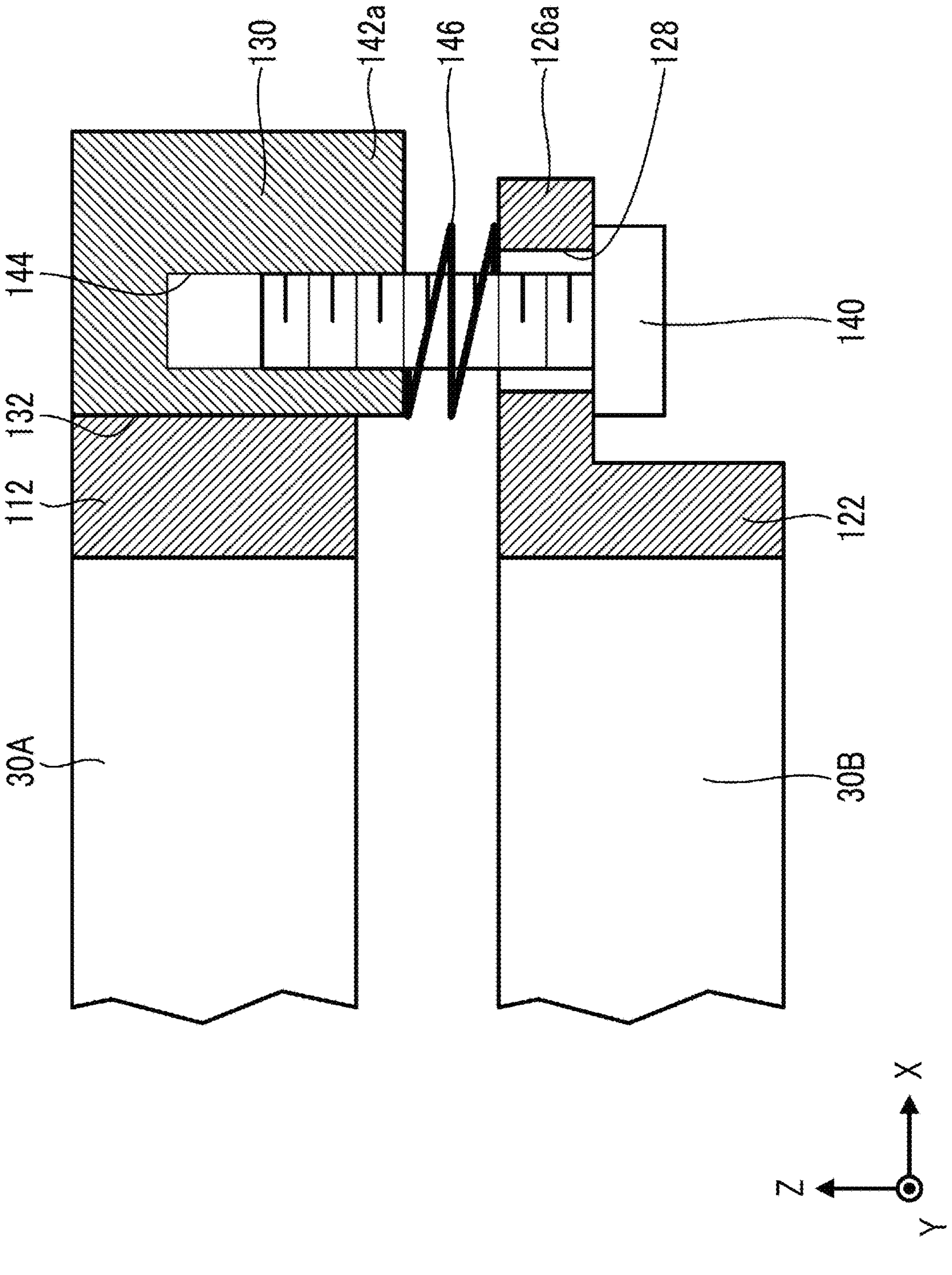
FIG. 14 is a cross-sectional view showing a support structure of the second unit in a second unit attachment portion.

FIG. 14 is a cross-sectional view showing a support structure of the second unit in the second unit attachment portion. FIG. 14 shows the support structure in the second unit attachment portion indicated by the reference numeral 126*a*. The same applies to the support structures in the other second unit attachment portions.

As shown in FIG. 14, the second unit 10B is attached to the base frame 130 with a second unit biasing spring 146 interposed between the second unit 10B and the base frame 130. The second unit biasing spring 146 is composed of a coil spring, for example. The second unit biasing spring 146 has an inner peripheral portion through which the second unit inclination adjusting screw 140 is passed, and is disposed between the second unit attachment portion 142*a* and the second frame screwing portion 126*a*. Similarly, for the second frame screwing portions 126*b* and 126*c*, the second unit biasing spring 146 is disposed between the second unit attachment portions 142*b* and 142*c*. The second unit biasing spring 146 biases the second unit 10B in each of the second frame screwing portions 126*a*, 126*b*, and 126*c* in a direction of spacing from the base frame 130. The second unit biasing spring 146 is an example of a biasing member.

As described above, the second unit 10B is attached to the base frame 130 with the second unit biasing spring 146 interposed between the second unit 10B and the second unit attachment portions 142*a*, 142*b*, and 142*c* in each of the second frame screwing portions 126*a*, 126*b*, and 126*c*. As a result, a function of adjusting the inclination of the second unit 10B with respect to the base frame 130 is realized.

The adjustment of the inclination is performed as follows. In each of the second frame screwing portions 126*a*, 126*b*, and 126*c*, in a case in which the second unit inclination adjusting screw 140 is loosened, the second unit 10B is spaced from the base frame 130 at the loosened location. On the other hand, in each of the second frame screwing portions 126*a*, 126*b*, and 126*c*, in a case in which the second unit inclination adjusting screw 140 is tightened, the second unit 10B approaches the base frame 130 at the tightened location. In this way, by individually adjusting a fastening amount (depth to be bonded to the screw hole) of the second unit inclination adjusting screw 140 in the second frame screwing portions 126*a*, 126*b*, and 126*c*, the interval with the base frame 130 can be adjusted individually. As a result, the inclination can be adjusted. For example, in FIG. 10, in a case in which the second unit inclination adjusting screw 140 of the second frame screwing portion 126*a* indicated by the reference numeral 126*a* is turned, the entire second unit 10B is inclined about the Y axis.

In this way, the second unit 10B can adjust the inclination with respect to the base frame 130 by individually adjusting the fastening amount of the second unit inclination adjusting screw 140 in each of the second frame screwing portions 126*a*, 126*b*, and 126*c*. Then, the inclination can be adjusted relatively to the first unit 10A attached to the base frame 130 by adjusting the inclination with respect to the base frame 130. Also, the inclination of the second light guide plate 30B with respect to the first light guide plate 30A can be adjusted.

In the image display unit 10 according to the present embodiment, a structure that holds the second unit 10B such that the inclination can be adjusted is an example of a first adjustment mechanism. Also, each of the second unit attachment portions 142*a*, 142*b*, and 142*c* provided in the base frame 130 is an example of a holding point.

[Action]

The image display unit 10 according to the present embodiment is assembled as follows.

First, the first unit 10A and the second unit 10B are assembled. In other words, the first display image light input device 20A and the first light guide plate 30A are assembled to the first frame 110. Also, the second display image light input device 20B and the second light guide plate 30B are assembled to the second frame 120.

Then, the first unit 10A and the second unit 10B are assembled to the base frame 130.

First, the first unit 10A is attached to the base frame. The first unit 10A is attached to the base frame 130 by fitting the first frame body 112 into the inner peripheral portion of the base frame 130 and fixing the first unit 10A with the first unit fixing screw 150.

Then, the second unit 10B is attached to the base frame. The second unit 10B is attached to the base frame 130 by screwing the second frame screwing portions 126*a*, 126*b*, and 126*c* at three locations with the second unit inclination adjusting screw 140. In this case, the attachment is performed with the second unit biasing spring 146 interposed between each of the second frame screwing portions 126*a*, 126*b*, and 126*c*, and the base frame 130.

As a result, the temporary assembly is completed. Thereafter, a display test is performed. In other words, the image is actually displayed and the display state is checked.

As a result of the display test, in a case in which two images are correctly displayed, it is determined that the adjustment is not necessary. The case in which the two images are correctly displayed is a case in which the images displayed from the respective units are correctly connected and can be recognized as one image. In other words, the case described above is a case in which the images are displayed without the seam.

On the other hand, in a case in which the two images are not correctly displayed, the adjustment is performed. In other words, the inclination of the second unit 10B is adjusted and corrected so that the seam cannot be seen.

After the adjustment is completed, the second unit 10B is fixed not to be moved. The same applies to a case in which it is determined that the adjustment is not necessary. The fixing is performed by, for example, using an adhesive to adhere the second frame screwing portions 126*a*, 126*b*, and 126*c* to the second unit attachment portions 142*a*, 142*b*, and 142*c*.

Thereafter, the image display unit 10 is incorporated into the lens portion of the eyeglass-type frame 2 constituting the head mount type image display apparatus 1 to complete the head mount type image display apparatus 1.

As described above, with the image display unit 10 according to the present embodiment, in a case in which the two units are used to generate the composite image, the disposition relationship between the two units can be adjusted. As a result, it is possible to make corrections after the fact even in a case in which the images from the two units are not correctly connected at the stage of assembly. As a result, a high-quality image can be presented. Also, required component accuracy and assembly accuracy can be reduced.

Modification Example

As described above, the inclination of the second unit 10B is adjusted by individually adjusting the intervals with the second unit attachment portions 142*a*, 142*b*, and 142*c* in the second frame screwing portions 126*a*, 126*b*, and 126*c*. The mechanism that adjusts the intervals with the second frame screwing portions 126*a*, 126*b*, and 126*c* in the second unit attachment portions 142*a*, 142*b*, and 142*c* is not limited to the mechanism according to the embodiment described above. Various configurations can be adopted.

Figure 15:
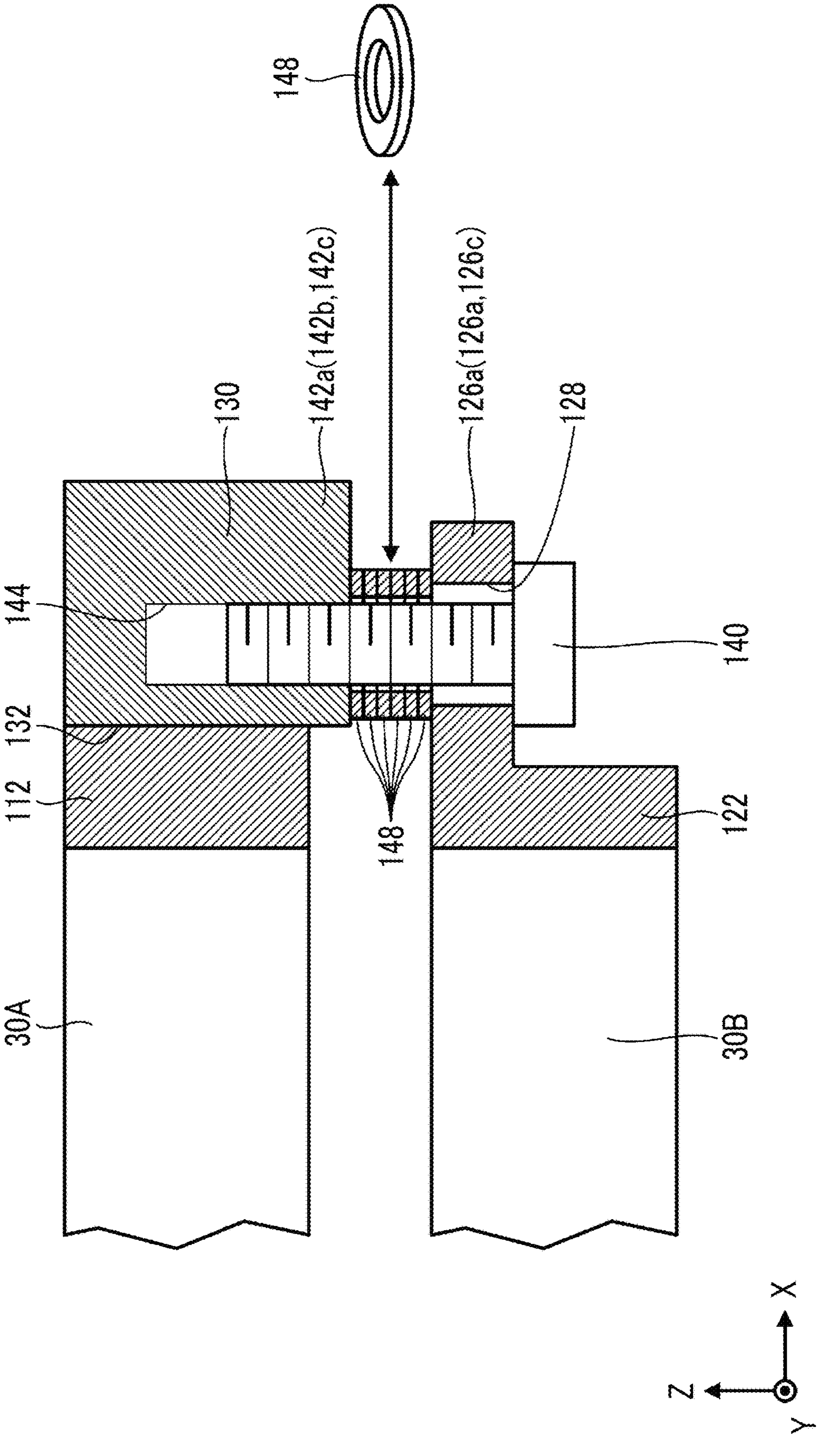
FIG. 15 is a diagram showing another example of a configuration in which an interval between a second frame screwing portion and the second unit attachment portion is adjusted.

FIG. 15 is a diagram showing another example of the configuration in which an interval between the second frame screwing portion and the second unit attachment portion is adjusted.

As shown in FIG. 15, in this example, by inserting a spacer 148 between the second frame screwing portion 126*a* (126*b*, 126*c*) and the second unit attachment portion 142*a* (142*b*, 142*c*), the interval therebetween is adjusted. The spacer 148 has a disk-like shape, has an inner peripheral portion through which the second unit inclination adjusting screw 140 is passed, and is inserted between the second frame screwing portion 126*a* (126*b*, 126*c*) and the second unit attachment portion 142*a* (142*b*, 142*c*). The spacer 148 is an example of a spacer member.

In this example, the interval is adjusted by adjusting the number of the spacers 148 to be inserted. In addition, a configuration can also be adopted in which a plurality of spacers having different thicknesses and are prepared, and the spacers to be inserted are replaced to adjust the interval.

In a case of this example, since the fixation is performed by tightening with the second unit inclination adjusting screw 140, in principle, adhesion or the like after the adjustment is not necessary. It should be noted that, in order to keep the adjusted state more firmly, a configuration may be adopted in which the adhesion is performed after the adjustment. In addition, as in the embodiment described above, each screwing portion may be biased by a spring. In addition, a shape of the spacer is not particularly limited, and a spacer having a shape, such as a wedge, can also be used.

In addition, in this example, the configuration is adopted in which the spacer is inserted at a predetermined position (position of the second unit attachment portion), but a configuration can also be adopted in which the spacer is inserted at any position to adjust the inclination. Specifically, a position and/or a thickness for inserting the spacer between the second frame body and the base frame is adjusted to adjust the inclination of the second unit with respect to the base frame. In this case, the second frame body and the base frame are fixed by adhesion or the like after the inclination is adjusted.

In addition, in a case of this example, a configuration can also be adopted in which the inclination is directly adjusted between the first light guide plate and the second light guide plate without using the frame or the like. That is, the position and/or the thickness for inserting the spacer between the first light guide plate and the second light guide plate is adjusted to adjust a relative inclination therebetween. In this case, the first light guide plate and the second light guide plate are fixed and integrated with each other by adhesion or the like after the inclination is adjusted. Then, the first display image light input device and the second display image light input device are assembled to the first light guide plate and second light guide plate, which are integrated with each other, to constitute the image display unit.

In addition, in the image display unit according to the embodiment described above, the configuration is adopted in which the entire second unit is held such that the inclination can be adjusted with respect to the base frame. However, a configuration may be adopted in which only the light guide plate of the second unit is held such that the inclination can be adjusted. Alternatively, a configuration may be adopted in which only the display image light input device is held such that the inclination can be adjusted. In a case in which only the light guide plate is held such that the inclination can be adjusted, for example, a configuration is adopted in which the light guide plate and the display image light input device are independently attached to the base frame, and a configuration is adopted in which only the light guide plate is held such that the inclination can be adjusted. Similarly, in a case in which only the display image light input device is held such that the inclination can be adjusted, for example, a configuration is adopted in which the light guide plate and the display image light input device are independently attached to the base frame, and a configuration is adopted in which only the display image light input device is held such that the inclination can be adjusted.

In addition, in the embodiment described above, the configuration is adopted in which the second unit is held at three points (three holding points), but a configuration can be adopted in which the second unit is held at two or more points. In a case of holding at two points, the second unit is held such that the inclination can be adjusted in only one direction.

Also, in the embodiment described above, the configuration is adopted in which each unit is held by the base frame, and the second unit is held such that the inclination can be adjusted with respect to the base frame. However, a configuration may be adopted in which the second unit is directly held with respect to the first unit such that the inclination can be adjusted. In this case, for example, the first frame body of the first unit comprises the second unit attachment portion.

Second Embodiment

The image display unit according to the first embodiment has the configuration in which the inclination can be relatively adjusted between the two units. Further, the image display unit according to the present embodiment has the configuration in which the planar position can be adjusted. In other words, the configuration is adopted in which a shift amount can be adjusted.

[Configuration]

Figure 16:
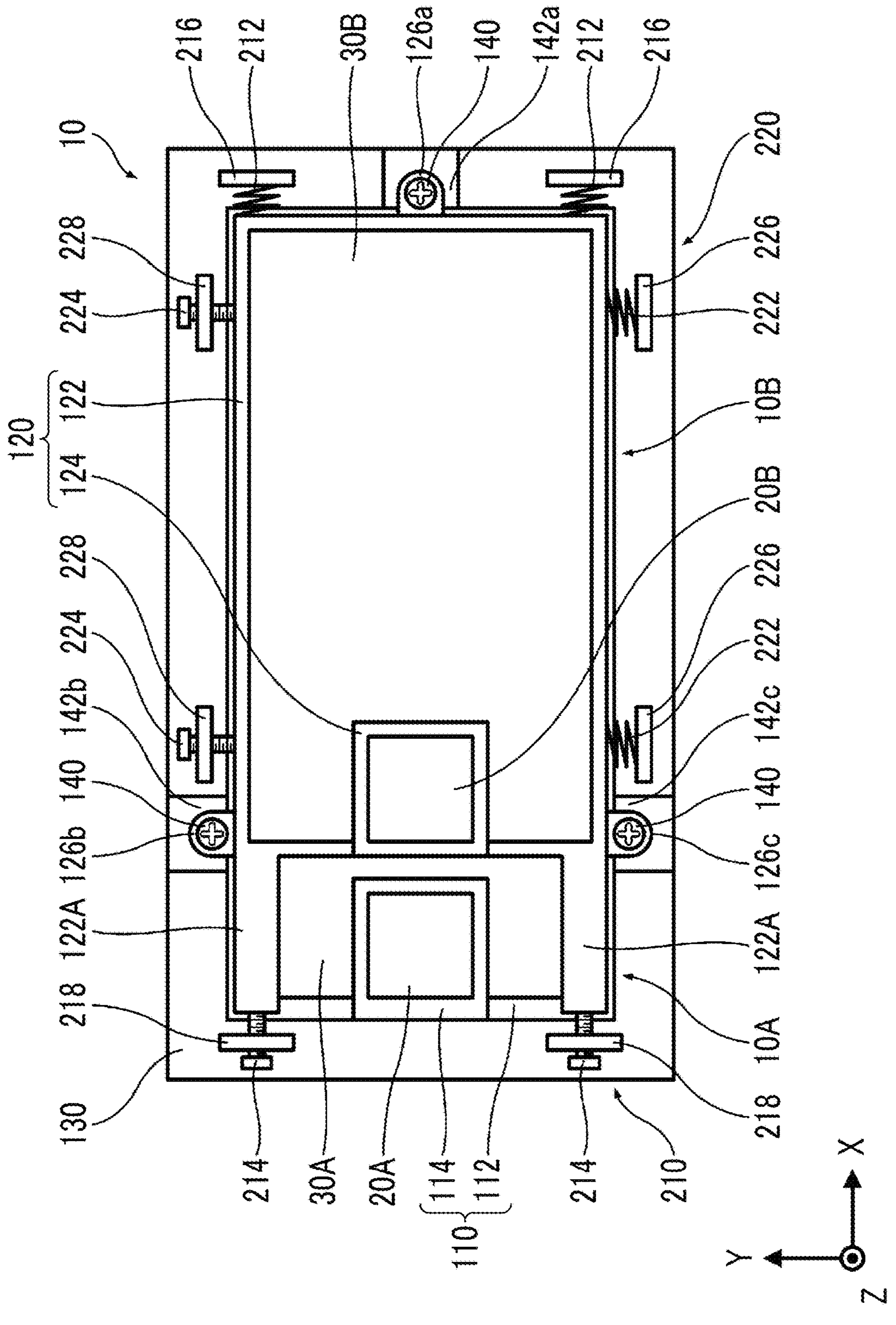
FIG. 16 is a front view showing a schematic configuration of the image display unit.

FIG. 16 is a front view showing a schematic configuration of the image display unit.

The image display unit 10 according to the present embodiment comprises a mechanism that adjusts the position of the second unit 10B in addition to the mechanism that adjusts the inclination of the second unit 10B. It should be noted that, since the mechanism that adjusts the inclination is the same as the mechanism according to the first embodiment, only the mechanism that adjusts the position will be described here. The mechanism that adjusts the position is another example of the first adjustment mechanism.

As shown in FIG. 16, the mechanism that adjusts the position is composed of a lateral position adjustment mechanism 210 that adjusts the position in the lateral direction (X axis direction) and a vertical position adjustment mechanism 220 that adjusts the position in a vertical direction (Y axis direction).

The lateral position adjustment mechanism 210 is mainly composed of a pair of lateral biasing springs 212 and a pair of lateral position adjusting screws 214.

The pair of lateral biasing springs 212 are attached to the base frame 130 via a bracket 216. Each of the pair of lateral biasing springs 212 contacts one side surface (right side in FIG. 16) of the second frame body 122 to bias the second unit 10B in the lateral direction.

The pair of lateral position adjusting screws 214 are disposed to face the pair of lateral biasing springs 212 with the second unit 10B interposed therebetween. Each lateral position adjusting screw 214 is attached to the base frame 130 via a bracket 218. Specifically, each lateral position adjusting screw 214 is attached to a screw hole (not shown) provided in the bracket 218.

A distal end of each lateral position adjusting screw 214 attached to the bracket 218 is brought into contact with a screw contact portion 122A provided on the other side surface (left side in FIG. 16) of the second frame body 122. As a result, the second unit 10B is interposed between the pair of lateral biasing springs 212 and the pair of lateral position adjusting screws 214 in the lateral direction.

The vertical position adjustment mechanism 220 is mainly composed of a pair of vertical biasing springs 222 and a pair of vertical position adjusting screws 224.

The pair of vertical biasing springs 222 are attached to the base frame 130 via a bracket 226. Each of the pair of vertical biasing springs 222 contacts an upper surface of the second frame body 122 to bias the second unit 10B in the vertical direction (down direction).

The pair of vertical position adjusting screws 224 are disposed to face the pair of vertical biasing springs 222 with the second unit 10B interposed therebetween. Each vertical position adjusting screw 224 is attached to the base frame 130 via a bracket 228. Specifically, each vertical position adjusting screw 224 is attached to a screw hole (not shown) provided in the bracket 228.

A distal end of each vertical position adjusting screw 224 attached to the bracket 228 is brought into contact with a lower surface of the second frame body 122. As a result, the second unit 10B is interposed between the pair of vertical biasing springs 222 and the pair of vertical position adjusting screws 224 in the vertical direction.

[Action]

Here, an adjustment method of the position of the second unit 10B will be described.

With the lateral position adjustment mechanism 210 and the vertical position adjustment mechanism 220 having the configuration described above, a relative position between the first unit 10A and the second unit 10B can be adjusted. The adjustment is performed separately in the lateral direction (X axis direction) and the vertical direction (Y axis direction).

The adjustment i the lateral direction is performed by the lateral position adjusting screw 214. In a case in which the lateral position adjusting screw 214 is turned, the lateral position adjusting screw 214 is moved back and forth in the lateral direction. As a result, the second unit 10B is moved in the lateral direction by being pressed by the lateral position adjusting screw 214. In other words, the position is adjusted in the lateral direction.

The adjustment in the vertical direction is performed by the vertical position adjusting screw 224. In a case in which the vertical position adjusting screw 224 is turned, the vertical position adjusting screw 224 is moved back and forth in the vertical direction. As a result, the second unit 10B is moved in the vertical direction by being pressed by the vertical position adjusting screw 224. In other words, the position is adjusted in the vertical direction.

It should be noted that a movable range of the second unit 10B is a range of a gap formed between the hole 128 and the second unit inclination adjusting screw 140 in each of the second frame screwing portions 126*a*, 126*b*, and 126*c*. Therefore, the gap (clearance) necessary for movement is secured between the hole 128 and the second unit inclination adjusting screw 140.

As described above, with the image display unit according to the present embodiment, the position can be adjusted in addition to the adjustment of the inclination. As a result, it is possible to perform more advanced adjustment.

It should be noted that, in the present embodiment, the configuration is adopted in which both the function of adjusting the inclination the function of adjusting the position are provided, but a configuration can also be adopted in which only the function of adjusting the position is provided.

In addition, in the present embodiment, the configuration is adopted in which the entire second unit is held such that the inclination can be adjusted and the position can be adjusted with respect to the base frame, but a configuration can also be adopted in which only the light guide plate is held such that the inclination can be adjusted and the position can be adjusted. That is, a configuration can be adopted in which only the light guide plate is held such that the inclination can be adjusted and the position can be adjusted independently of the display image light input device. Similarly, a configuration can also be adopted in which only the display image light input device is independently held such that the inclination can be adjusted and the position can be adjusted.

Also, in the embodiment described above, the configuration is adopted in which each unit is held by the base frame, and the second unit is held such that the inclination can be adjusted and the position can be adjusted with respect to the base frame. However, a configuration may be adopted in which the second unit is directly held with respect to the first unit such that the inclination can be adjusted and/or the position can be adjusted.

Third Embodiment

The composite state of the images to be observed can also be adjusted by a disposition relationship between the light guide plate and the display image light input device.

In the present embodiment, a case will be described in which the composite state of the images to be observed is adjusted by adjusting the disposition relationship between the light guide plate and the display image light input device.

Figure 17:
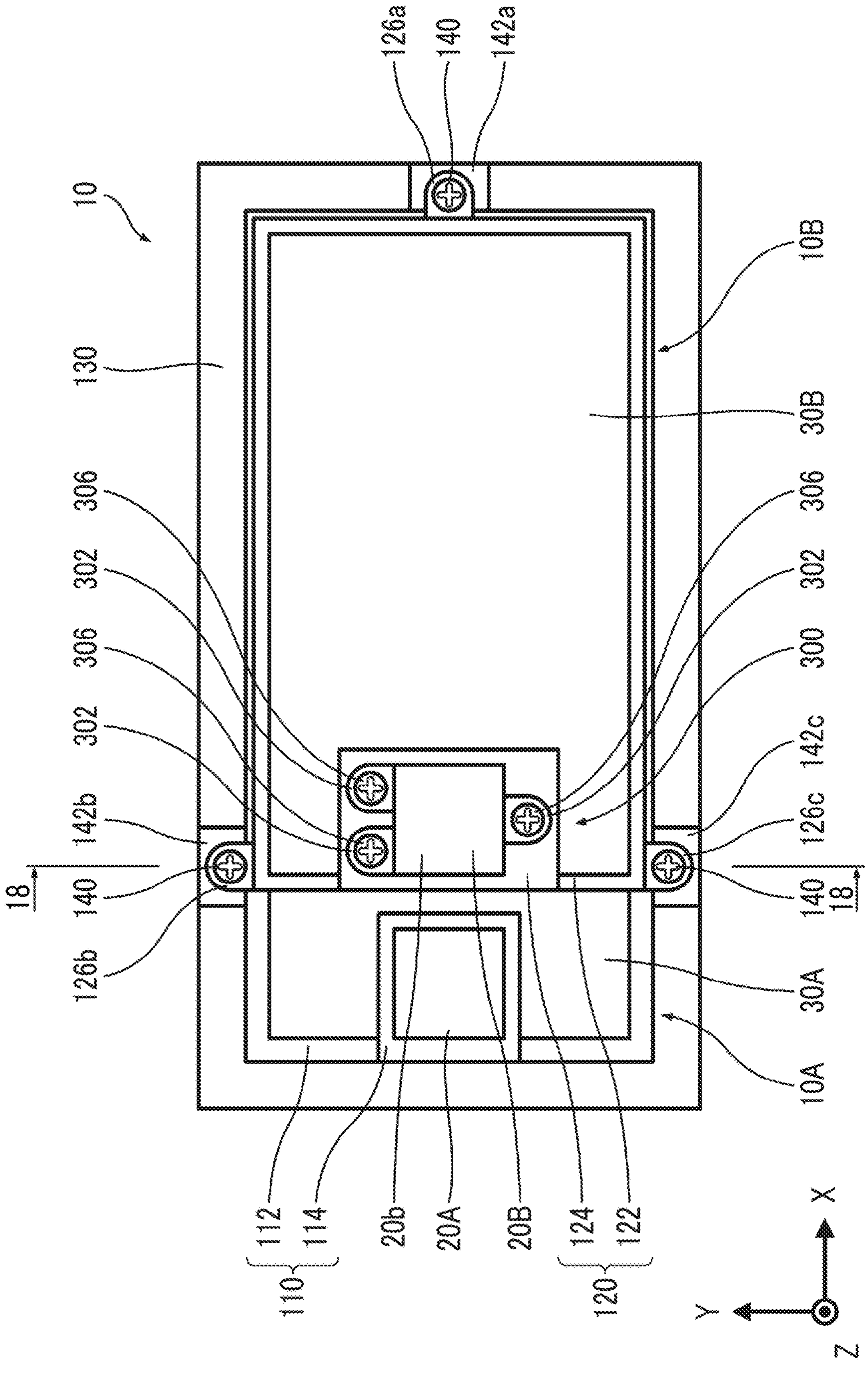
FIG. 17 is a front view showing a schematic configuration of the image display unit.
Figure 18:
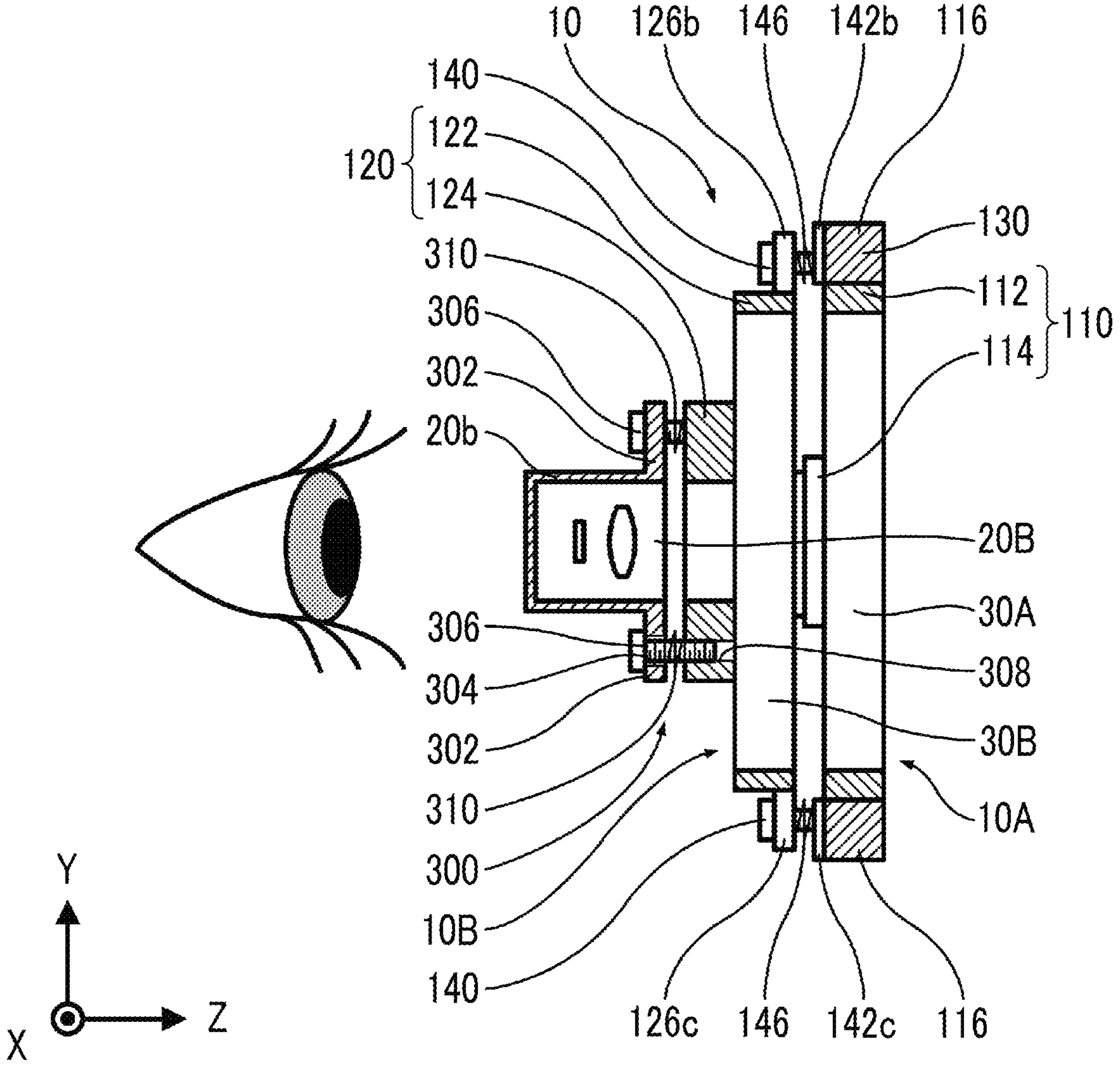
FIG. 18 is a cross-sectional view taken along a line 18-18 of FIG. 17.

FIG. 17 is a front view showing a schematic configuration of the image display unit. FIG. 18 is a cross-sectional view taken along a line 18-18 of FIG. 17.

As shown in FIGS. 17 and 18, the image display unit 10 according to the present embodiment comprises an inclination adjustment mechanism 300 that adjusts the inclination of the second display image light input device 20B. The inclination adjustment mechanism 300 is an example of the mechanism (second adjustment mechanism and third adjustment mechanism) that adjusts the disposition relationship between the light guide plate and the display image light input device.

The inclination adjustment mechanism 300 has the same configuration as the mechanism that adjusts the inclination of the second unit 10B (holding structure of the second unit 10B with respect to the base frame 130). That is, The inclination adjustment mechanism 300 is composed of three second display image light input device screwing portions 302, holes 304 provided in the respective second display image light input device screwing portions 302, three second display image light input device position adjusting screws 306 passed through the holes 304 of the respective second display image light input device screwing portions 302, three screw holes 308 into which the respective second display image light input device position adjusting screws 306 are fitted, and three second display image light input device biasing springs 310 provided in the respective second display image light input device position adjusting screws 306.

The second display image light input device screwing portion 302 is integrally provided in a housing 20*b* of the second display image light input device 20B. The screw hole 308 is provided in the second display image light input device attachment portion 124. The second display image light input device biasing spring 310 is disposed between each of the second display image light input device screwing portions 302 and the second display image light input device attachment portion 124.

The second display image light input device 20B is attached to the second display image light input device attachment portion 124 by passing the second display image light input device position adjusting screws 306 through the holes 304 of the three second display image light input device screwing portions 302 provided in the housing 20*b*, and fitting the respective second display image light input device position adjusting screws 306 into the three screw holes 308 provided in the second display image light input device attachment portion 124. In a case of the attachment, the second display image light input device biasing springs 310 are attached to the respective second display image light input device position adjusting screws 306, and the second display image light input device biasing spring 310 is disposed between each of the second display image light input device screwing portions 302 and the second display image light input device attachment portion 124.

With the image display unit 10 according to the present embodiment configured as described above, in the second unit 10B, the inclination of the second display image light input device 20B with respect to the second light guide plate 30B can be adjusted. The inclination is adjusted by rotating the second display image light input device position adjusting screws 306 at three locations. By individually rotating each of the second display image light input device position adjusting screws 306, the interval between each of the second display image light input device screwing portions 302 and the second display image light input device attachment portion 124 is individually changed. As a result, the inclination (inclination of the optical axis) of the second display image light input device 20B with respect to the second light guide plate 30B is changed. Then, the position of the image displayed by the second unit 10B is changed by changing the inclination of the second display image light input device 20B with respect to the second light guide plate 30B. As a result, the composite state of the images to be observed via the two display units can be adjusted. After the adjustment is completed, the adjustment is fixed by adhesion or the like not to change the completed state.

It should be noted that, in the image display unit according to the embodiment described above, only the second unit comprises the mechanism that adjusts the inclination of the display image light input device. However, similarly, the first unit may also comprise the mechanism that adjusts the inclination of the display image light input device.

In addition, although the image display unit according to the embodiment described above has the configuration in which only the inclination of the display image light input device can be adjusted, but a configuration may be adopted in which the position can be adjusted in addition to the adjustment of the inclination or instead of the adjustment of the inclination. As the mechanism that adjusts the position of the display image light input device, for example, a mechanism similar to the mechanism adopted in the image display unit according to the second embodiment can be adopted.

In addition, the image display unit according to the embodiment described above has the configuration in which the inclination of the entire second unit can also be adjusted. However, in a case in which the mechanism that adjusts the inclination of the display image light input device is provided, the mechanism that adjusts the inclination of the entire second unit can be omitted. In other words, the second unit can be fixedly attached at a predetermined position of the base frame.

In addition, the image display unit according to the embodiment described above has the configuration in which the inclination of the display image light input device is adjusted to adjust the inclination between the display image light input device and the light guide plate. However, a configuration may be adopted in which the inclination of the light guide plate is adjusted to adjust the inclination between the display image light input device and the light guide plate.

Fourth Embodiment

Figure 19:
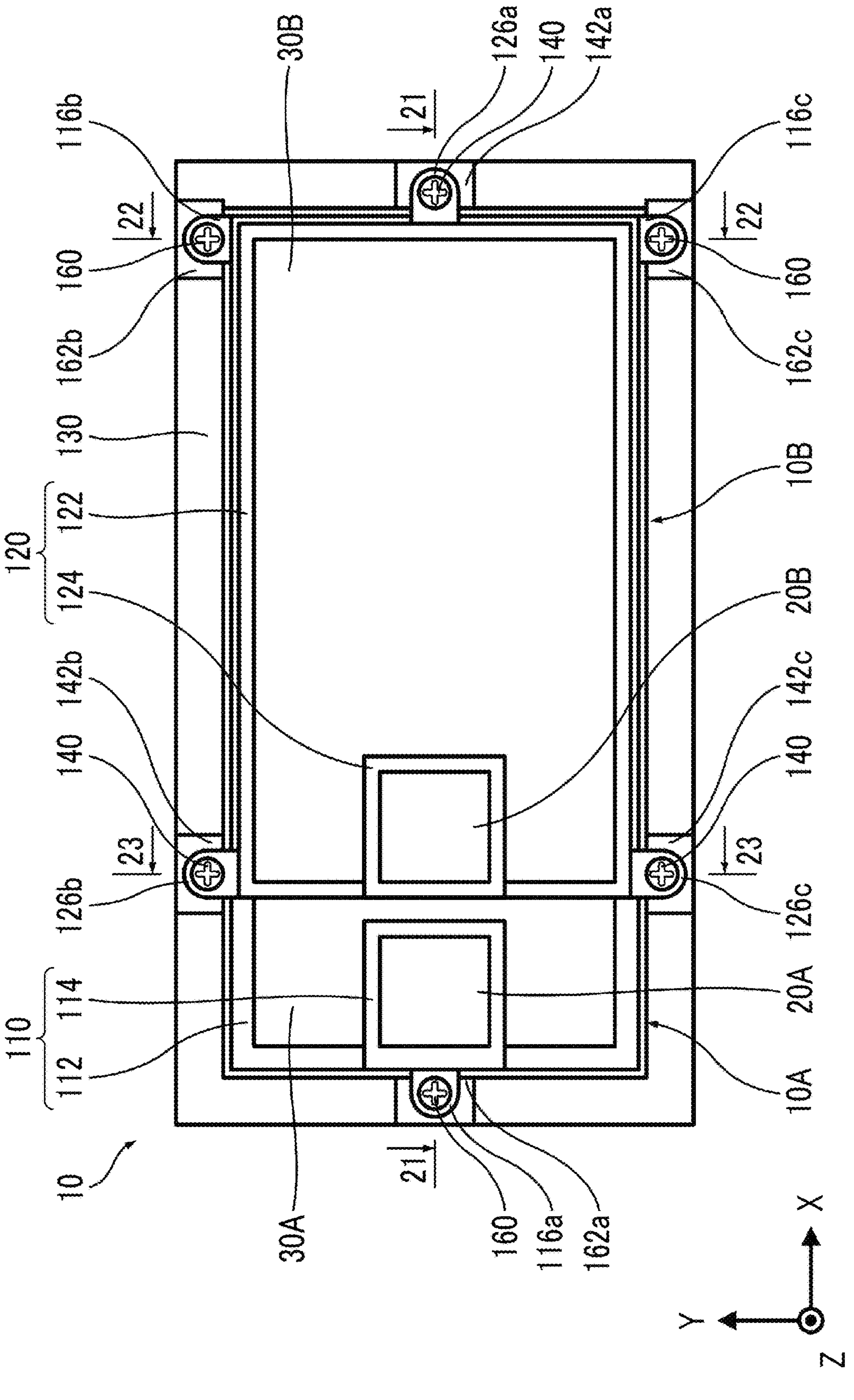
FIG. 19 is a front view showing a schematic configuration of the image display unit.
Figure 20:
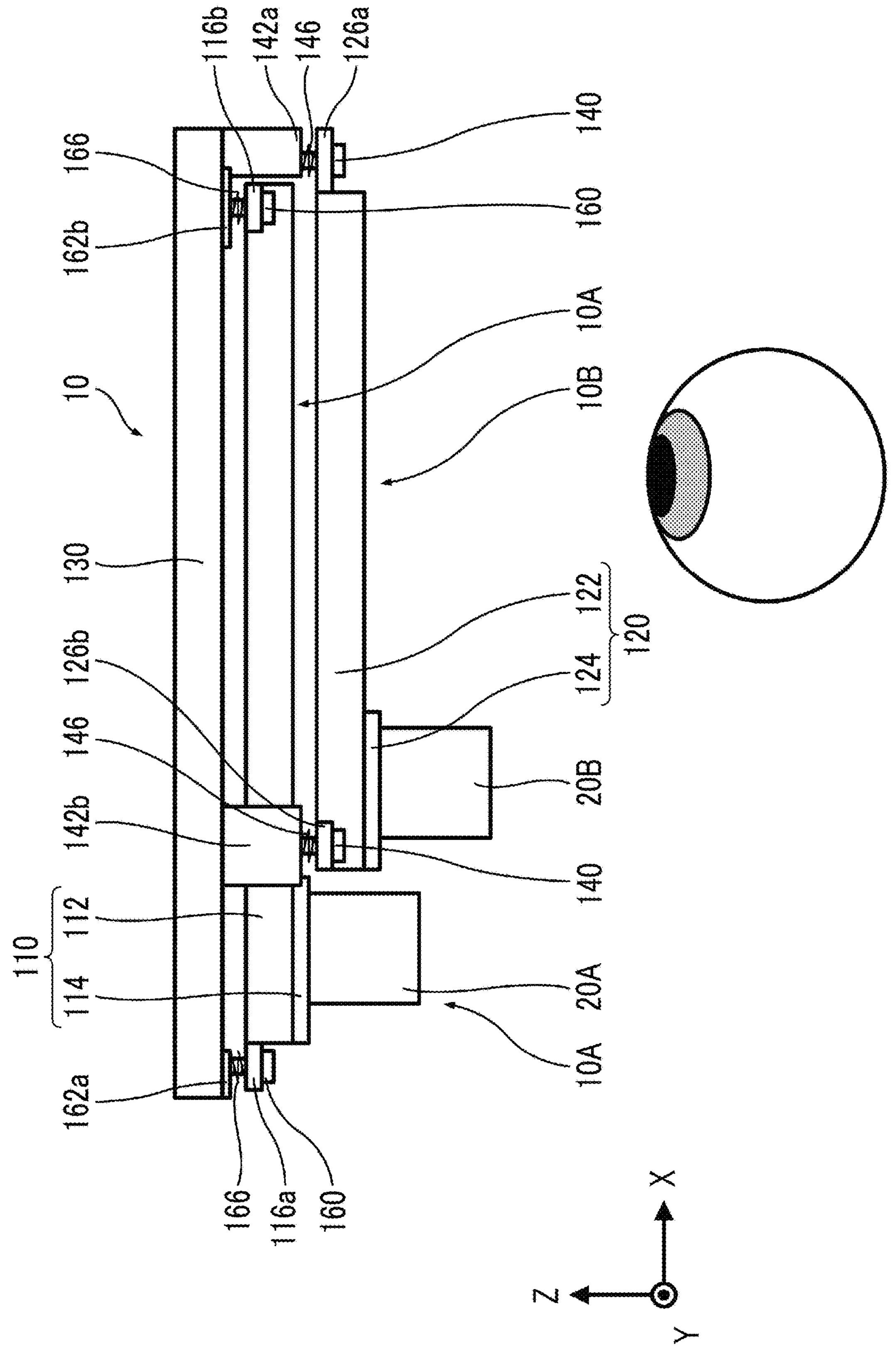
FIG. 20 is a top view of the image display unit shown in FIG. 19.
Figure 21:
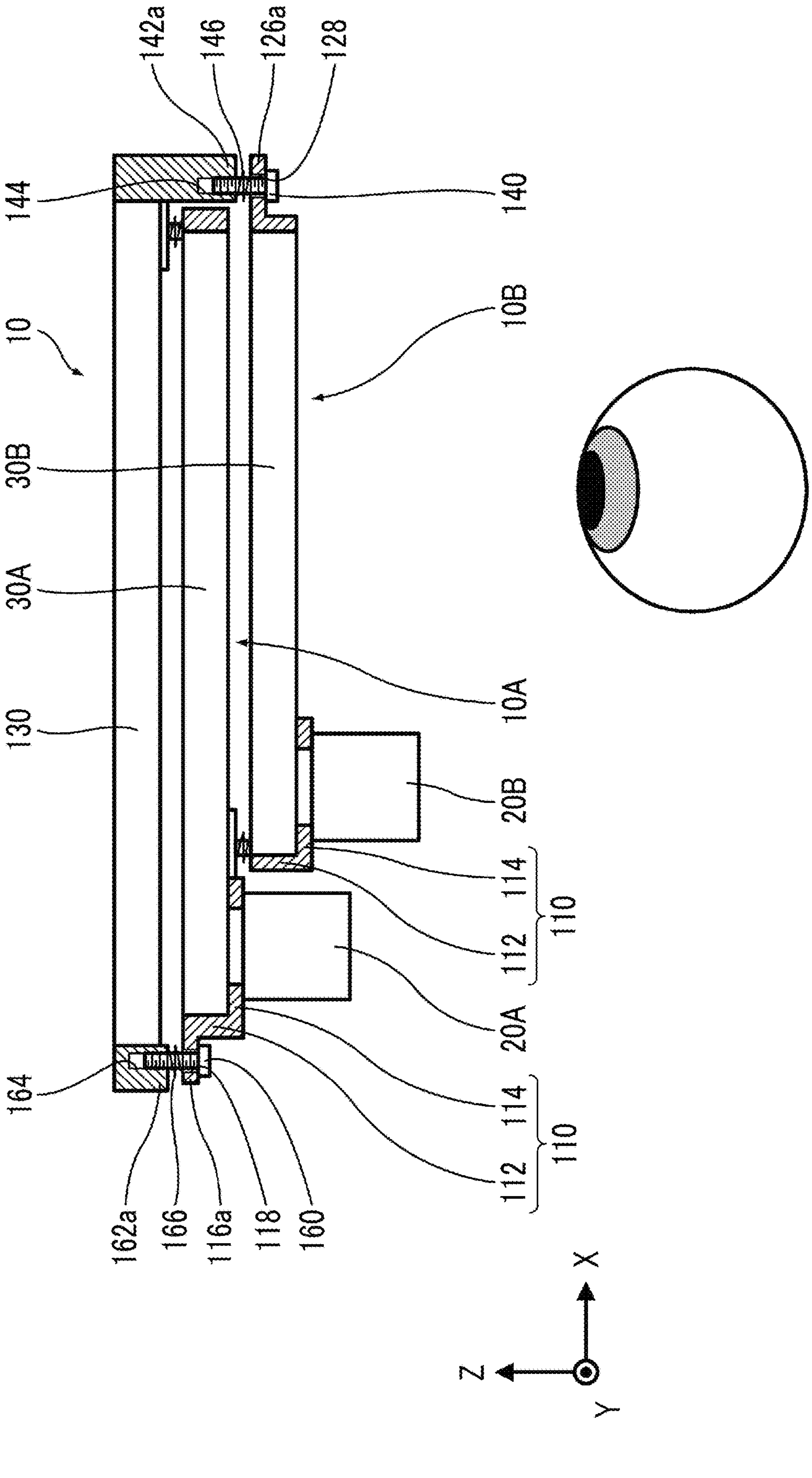
FIG. 21 is a cross-sectional view taken along a line 21-21 of FIG. 19.
Figure 22:
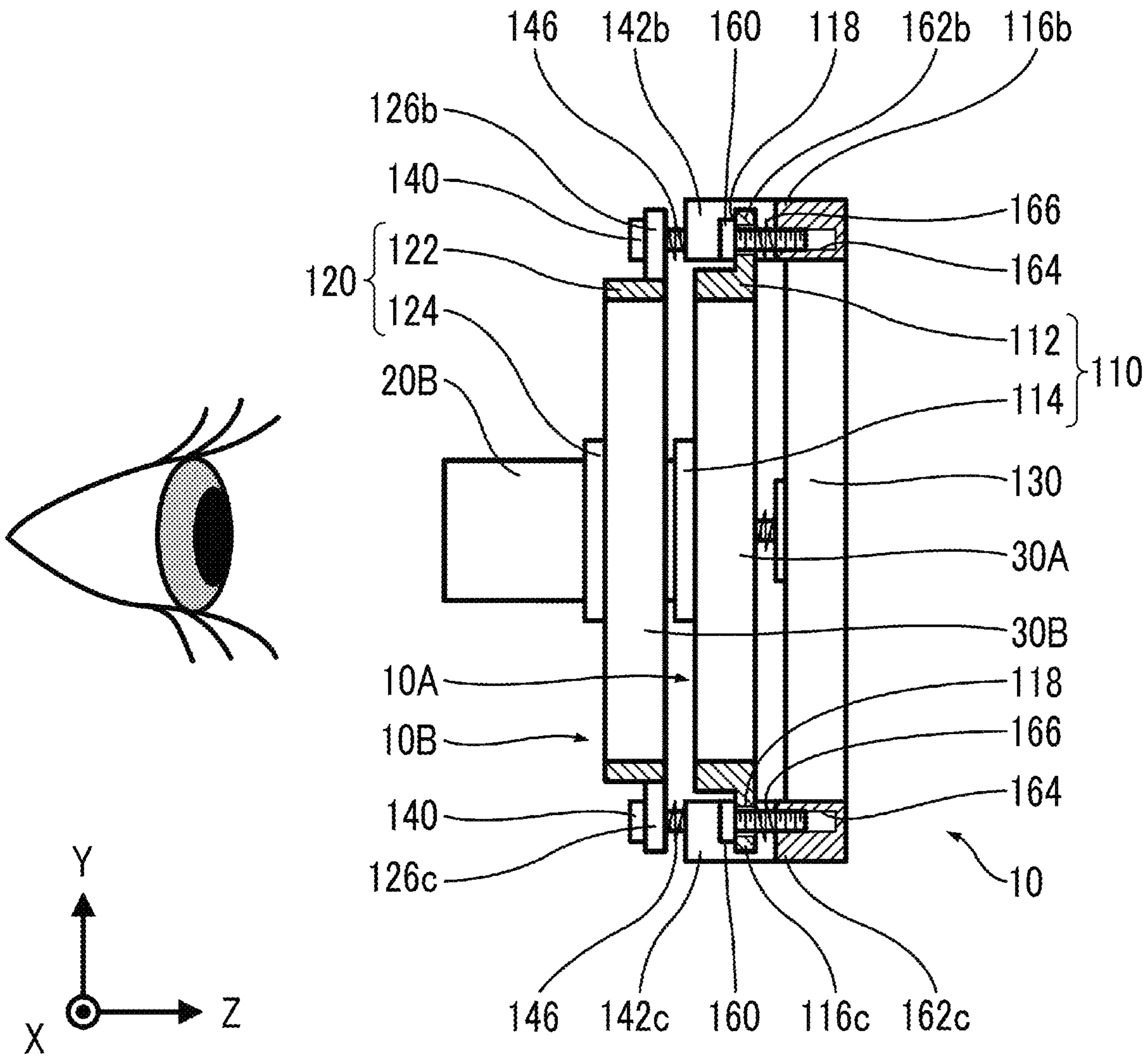
FIG. 22 is a cross-sectional view taken along a line 22-22 of FIG. 19.
Figure 23:
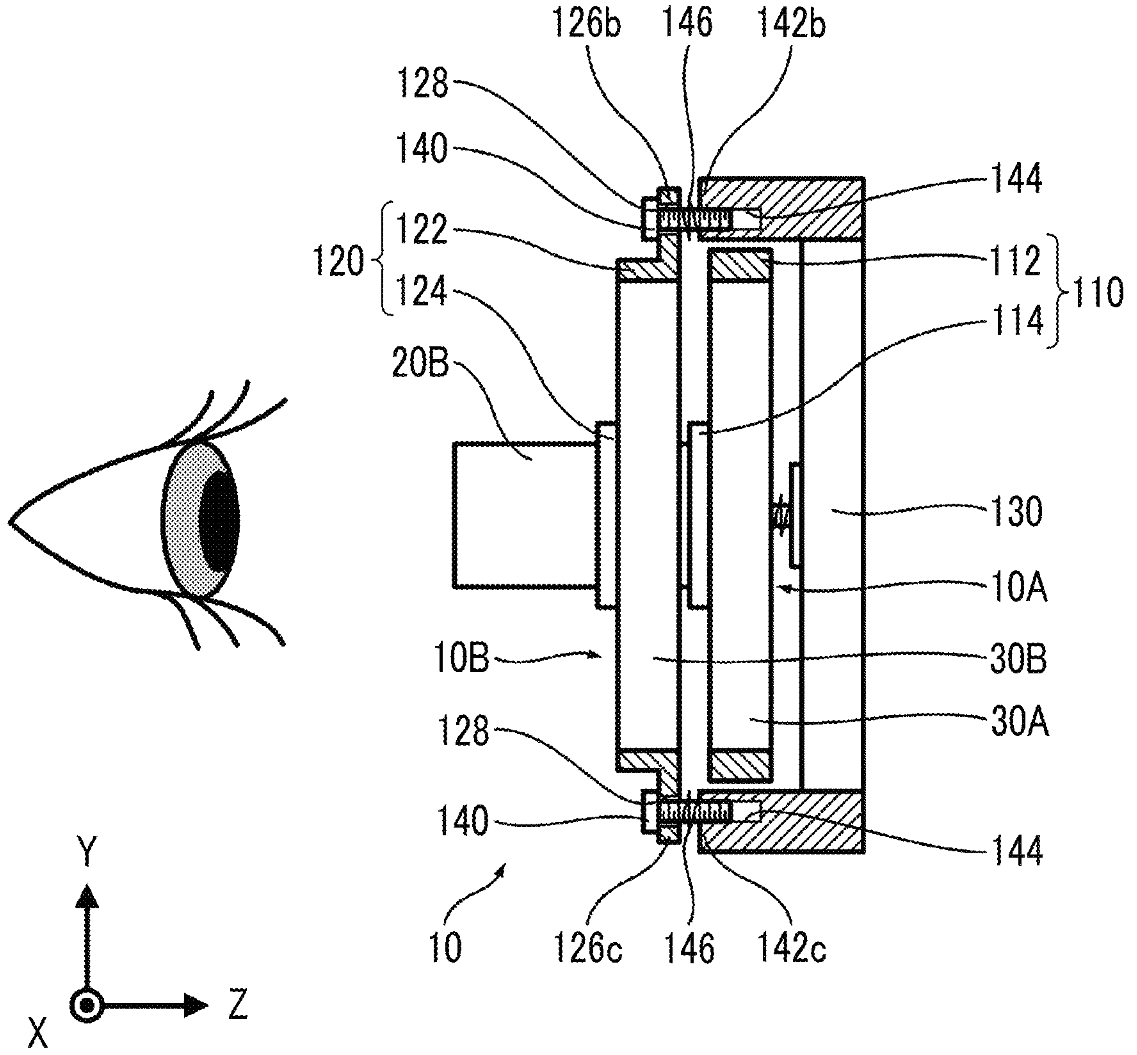
FIG. 23 is a cross-sectional view taken along a line 23-23 of FIG. 19.

FIG. 19 is a front view showing a schematic configuration of the image display unit. FIG. 20 is a top view of the image display unit shown in FIG. 19. FIG. 21 is a cross-sectional view taken along a line 21-21 of FIG. 19. FIG. 22 is a cross-sectional view taken along a line 22-22 of FIG. 19. FIG. 23 is a cross-sectional view taken along a line 23-23 of FIG. 19.

In the image display unit 10 according to the present embodiment, the two units are individually held such that the inclination can be adjusted.

[Holding Structure of First Unit]

The first unit 10A is attached to the base frame 130 by using a first unit position adjusting screw 160. The first unit position adjusting screw 160 is an example of the fastening member.

As shown in FIG. 19, the first frame body 112 comprises first frame screwing portions 116*a*, 116*b*, and 116*c* at three locations on an outer peripheral portion. The disposition of the three first frame screwing portions 116*a*, 116*b*, and 116*c* is as follows. That is, the first frame screwing portion 116*a* indicated by the reference numeral 116*a* is provided at the center of the left side of the first frame body 112 in FIG. 19. The first frame screwing portion 116*b* indicated by the reference numeral 116*b* is provided at the right end of the upper side of the first frame body 112 in FIG. 19. The first frame screwing portion 116*c* indicated by the reference numeral 116*c* is provided at the left end of the lower side of the first frame body 112 in FIG. 19.

Each of the first frame screwing portions 116*a*, 116*b*, and 116*c* comprises a hole 118 through which the first unit position adjusting screw 160 is passed. Each hole 118 has an inner diameter φ2 which is larger than an outer diameter φ1 of the first unit position adjusting screw 160 (φ1<φ2). That is, each hole 118 has a relationship that creates a gap (so-called "clearance") between the hole 118 and the first unit position adjusting screw 160 in a case in which the first unit position adjusting screw 160 is passed through the hole 118.

The base frame 130 comprises first unit attachment portions 162*a*, 162*b*, and 162*c* at three locations on the front side surface. The first unit attachment portions 162*a*, 162*b*, and 162*c* are each composed of a columnar protrusion portion, and are disposed on the same plane. The disposition of the first unit attachment portions 162*a*, 162*b*, and 162*c* is the same as the disposition of the three first frame screwing portions 116*a*, 116*b*, and 116*c* provided in the first frame body 112.

Each of the first unit attachment portions 162*a*, 162*b*, and 162*c* comprises a screw hole 164. The screw hole 164 is disposed at the center of the top of each of the first unit attachment portions 162*a*, 162*b*, and 162*c*. In addition, the screw hole 164 has dimensions corresponding to the first unit position adjusting screw 160, and is disposed along the depth direction (Z axis direction).

The first unit 10A is attached to the base frame 130 by passing the first unit position adjusting screw 160 through the hole 118 of each of the first frame screwing portions 116*a*, 116*b*, and 116*c*, and fitting the first unit position adjusting screw 160 into the screw hole 164 of each of the first unit attachment portions 162*a*, 162*b*, and 162*c* of the base frame 130. In addition, the first unit 10A is attached to the base frame 130 with a first unit biasing spring 166 interposed between the first unit 10A and the base frame 130. The first unit biasing spring 166 is composed of a coil spring, for example. The first unit biasing spring 166 has an inner peripheral portion through which the first unit position adjusting screw 160 is passed, and is disposed between the first unit attachment portions 162*a*, 162*b*, and 162*c* and the first frame screwing portions 116*a*, 116*b*, and 116*c*. The first unit biasing spring 166 is an example of the biasing member.

As described above, the first unit 10A is attached to the base frame 130 with the first unit biasing spring 166 interposed between the first unit 10A and the first unit attachment portions 162*a*, 162*b*, and 162*c* in each of the first frame screwing portions 116*a*, 116*b*, and 116*c*. As a result, a function of adjusting the inclination of the first unit 10A with respect to the base frame 130 is realized.

The adjustment of the inclination is performed as follows. In each of the first frame screwing portions 116*a*, 116*b*, and 116*c*, in a case in which the first unit position adjusting screw 160 is loosened, the first unit 10A is spaced from the base frame 130 at the loosened location. On the other hand, in a case in which the first unit position adjusting screw 160 is tightened, the first unit 10A approaches the base frame 130 at the tightened location. In this way, by individually adjusting a fastening amount (depth to be bonded to the screw hole) of the first unit position adjusting screw 160 in the first frame screwing portions 116*a*, 116*b*, and 116*c*, the interval with the base frame 130 can be adjusted individually. As a result, the inclination can be adjusted. For example, in FIG. 21, in a case in which the first unit position adjusting screw 160 of the first frame screwing portion 116*a* indicated by the reference numeral 116*a* is turned, the entire first unit 10A is inclined about the Y axis.

In this way, the first unit 10A can adjust the inclination with respect to the base frame 130 by individually adjusting the fastening amount of the first unit position adjusting screw 160 in each of the first frame screwing portions 116*a*, 116*b*, and 116*c*. Then, the inclination can be adjusted relatively to the second unit 10B attached to the base frame 130 by adjusting the inclination with respect to the base frame 130.

[Holding Structure of Second Unit]

The holding structure of the second unit 10B is the same as the holding structure of the image display unit 10 according to the first embodiment. Therefore, the description of the configuration thereof will be omitted.

[Action]

The image display unit 10 according to the present embodiment is assembled as follows.

First, the first unit 10A and the second unit 10B are assembled. In other words, the first display image light input device 20A and the first light guide plate 30A are assembled to the first frame 110. Also, the second display image light input device 20B and the second light guide plate 30B are assembled to the second frame 120.

Then, the first unit 10A and the second unit 10B are assembled to the base frame 130.

First, the first unit 10A is attached to the base frame. The first unit 10A is attached to the base frame 130 by screwing the first frame screwing portions 116*a*, 116*b*, and 116*c* at three locations with the first unit position adjusting screw 160. In this case, the attachment is performed with the first unit biasing spring 166 interposed between each of the first frame screwing portions 116*a*, 116*b*, and 116*c*, and the base frame 130.

Then, the second unit 10B is attached to the base frame. The second unit 10B is attached to the base frame 130 by screwing the second frame screwing portions 126*a*, 126*b*, and 126*c* at three locations with the second unit inclination adjusting screw 140. In this case, the attachment is performed with the second unit biasing spring 146 interposed between each of the second frame screwing portions 126*a*, 126*b*, and 126*c*, and the base frame 130.

As a result, the temporary assembly is completed. Thereafter, a display test is performed. In other words, the image is actually displayed and the display state is checked.

As a result of the display test, in a case in which two images are correctly displayed, it is determined that the adjustment is not necessary. On the other hand, in a case in which the two images are not correctly displayed, the adjustment is performed. That is, the inclination of the first unit 10A and/or the second unit 10B is adjusted so that the seam cannot be seen.

After the adjustment is completed, one unit is fixed not to be moved. The same applies to a case in which it is determined that the adjustment is not necessary. The fixing is performed, for example, by using an adhesive to adhere the first frame screwing portions 116*a*, 116*b*, 116*c* and the second frame screwing portions 126*a*, 126*b*, and 126*c* to the base frame 130.

Thereafter, the image display unit 10 is incorporated into the lens portion of the eyeglass-type frame constituting the head mount type image display apparatus 1 to complete the head mount type image display apparatus 1.

As described above, with the image display unit 10 according to the present embodiment, in a case in which the two units are used to generate the composite image, the disposition relationship between the two units can be adjusted. As a result, it is possible to make corrections after the fact even in a case in which the images from the two units are not correctly connected at the stage of assembly. As a result, a high-quality image can be presented. Also, required component accuracy and assembly accuracy can be reduced.

In addition, with the image display unit 10 according to the present embodiment, the two units are individually held such that the inclination can be adjusted. As a result, a degree of freedom of the adjustment can be improved.

Modification Example

[Modification Example of Disposition of First Unit and Second Unit]

Figure 24:
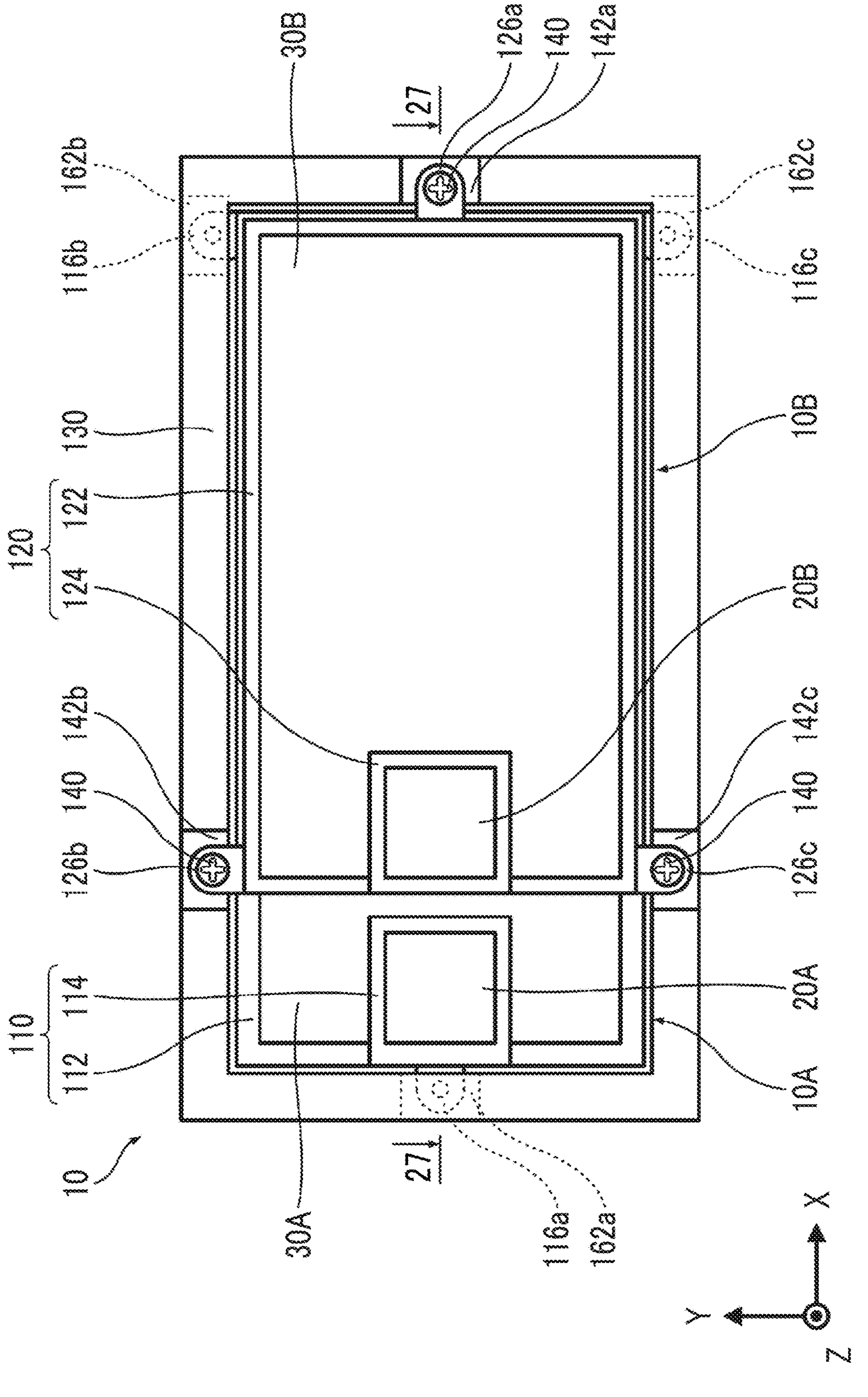
FIG. 24 is a front view showing a schematic configuration of a modification example of the image display unit.
Figure 25:
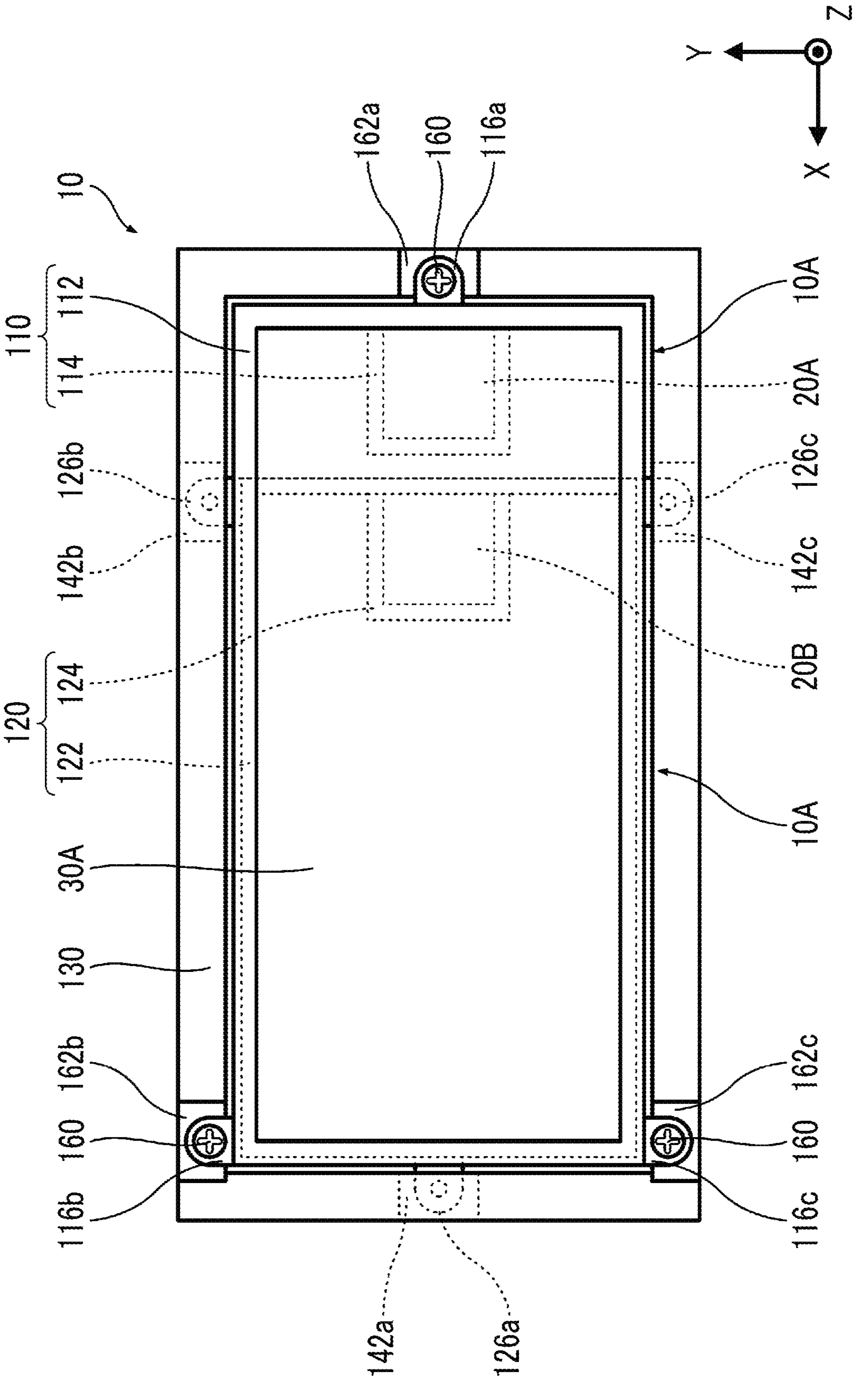
FIG. 25 is a rear view of the image display unit shown in FIG. 24.
Figure 26:
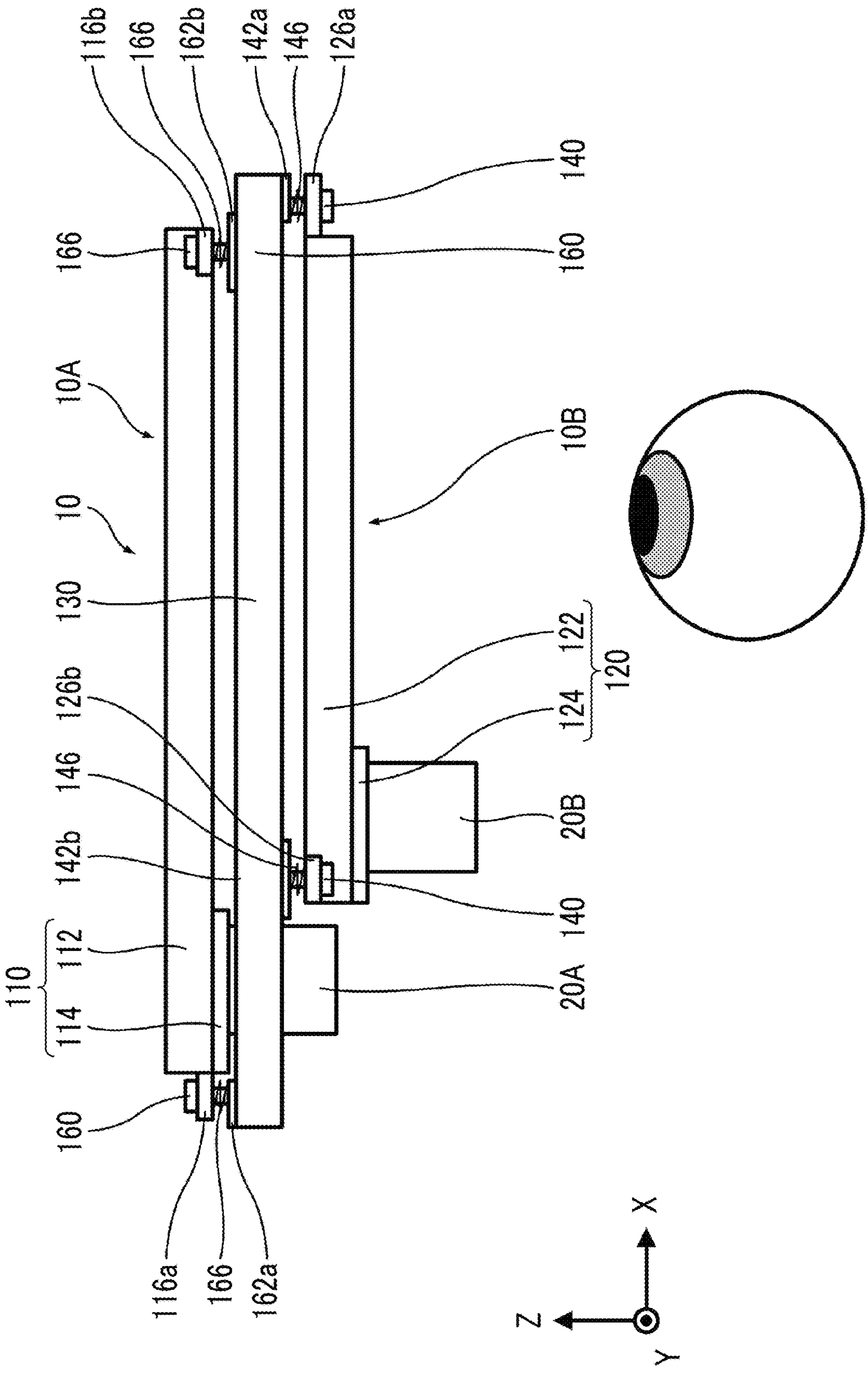
FIG. 26 is a top view showing a schematic configuration of the image display unit shown in FIG. 24.
Figure 27:
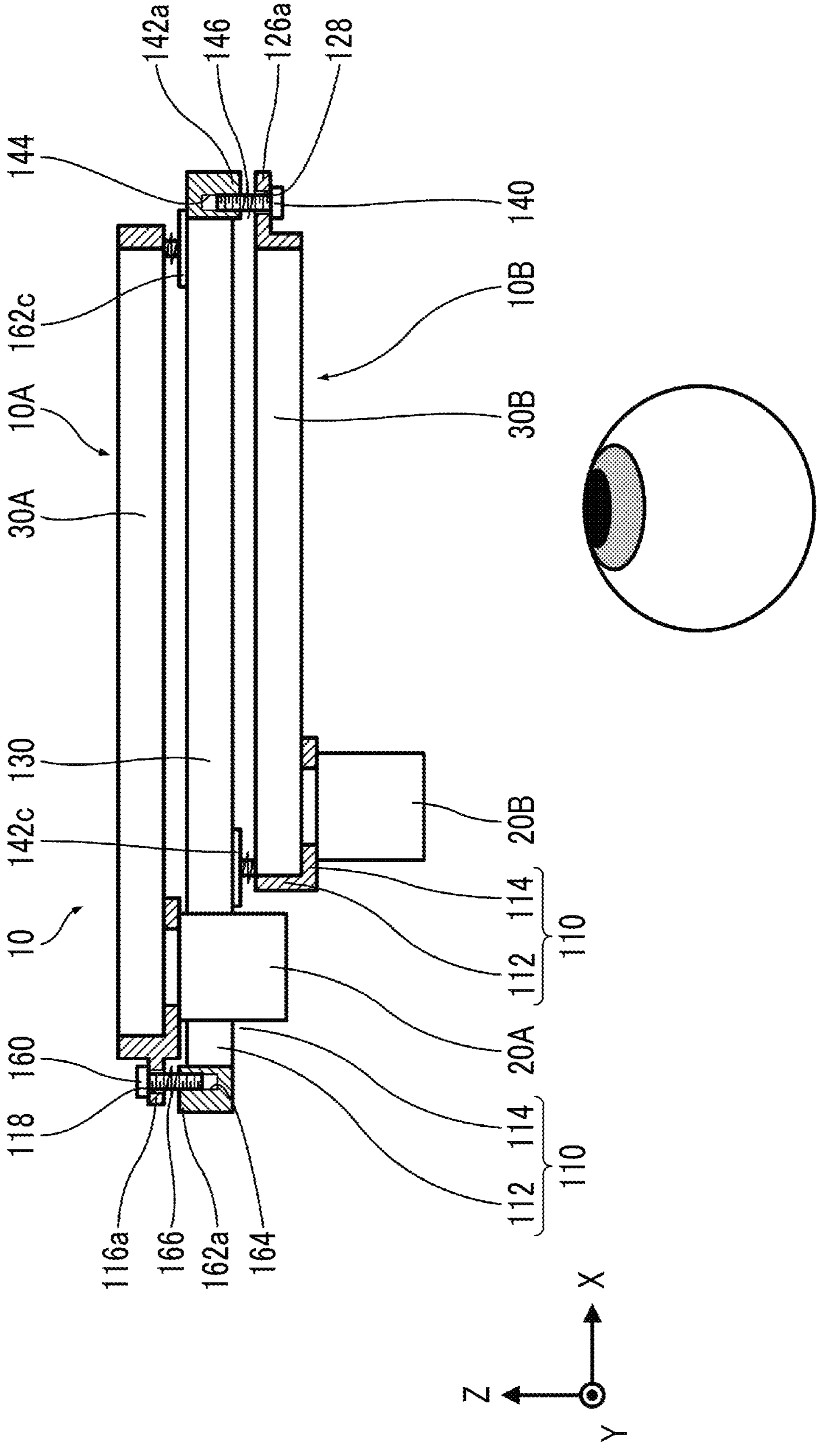
FIG. 27 is a cross-sectional view taken along a line 27-27 of FIG. 24.

FIG. 24 is a front view showing a schematic configuration of a modification example of the image display unit. FIG. 25 is a rear view of the image display unit shown in FIG. 24. FIG. 26 is a top view showing a schematic configuration of the image display unit shown in FIG. 24. FIG. 27 is a cross-sectional view taken along a line 27-27 of FIG. 24.

In the image display unit according to the embodiment described above, the first unit 10A and the second unit 10B have the configuration in which the first unit 10A and the second unit 10B are disposed in a superimposed manner on one side surface (front side surface) of the base frame 130. More specifically, the configuration is adopted in which the light guide plates of the respective units are disposed in a superimposed manner on one side surface of the base frame 130.

In the image display unit 10 of this example, the first unit 10A and the second unit 10B are disposed in a superimposed manner with the base frame 130 interposed therebetween. More specifically, the light guide plates of the respective units are disposed in a superimposed manner with the base frame 130 interposed therebetween.

In the example shown in FIG. 24, the second unit 10B is held on the front side surface of the base frame 130, and the first unit 10A is held on the rear side surface of the base frame 130. In this case, the front side surface of the base frame 130 comprises the second unit attachment portions 142*a*, 142*b*, and 142*c*, and the rear side surface comprises the first unit attachment portions 162*a*, 162*b*, and 162*c*.

It should be noted that, since the structure itself for holding each unit is the same as the structure of the embodiment described above, the description of the details thereof will be omitted.

Other Modification Examples

In addition to the mechanism that adjusts the inclination of each unit, or instead of the mechanism that adjusts the inclination, the mechanism that adjusts the position of each unit may be provided.

In addition, at least one of the units may comprise a mechanism that individually adjusts a relative disposition relationship between the light guide plate and the display image light input device. For example, each unit may comprise the mechanism that adjusts the inclination and/or the position of the display image light input device.

Fifth Embodiment

In the present embodiment, as an example, a case will be described in which the composite state of the images to be observed is electronically adjusted.

In this way, in the image display unit, the image displayed on the display element of each unit is observed via the light guide plate. The light of the image displayed on the display element (display image light) is input to a predetermined position of the light guide plate via the input optical system. Therefore, by adjusting this input position, the position of the image observed via each unit can be adjusted. The position for inputting the display image light can also be adjusted by changing the position of the image to be displayed on the display element, in addition to the configuration in which the position is mechanically adjusted as in the image display unit according to the third embodiment.

The position of the image to be displayed on the display element is adjusted, for example, by changing the position for displaying the image in a display area of the display element. Therefore, in this case, the image is displayed by using a part of the display area included in the display element.

Figure 28B:
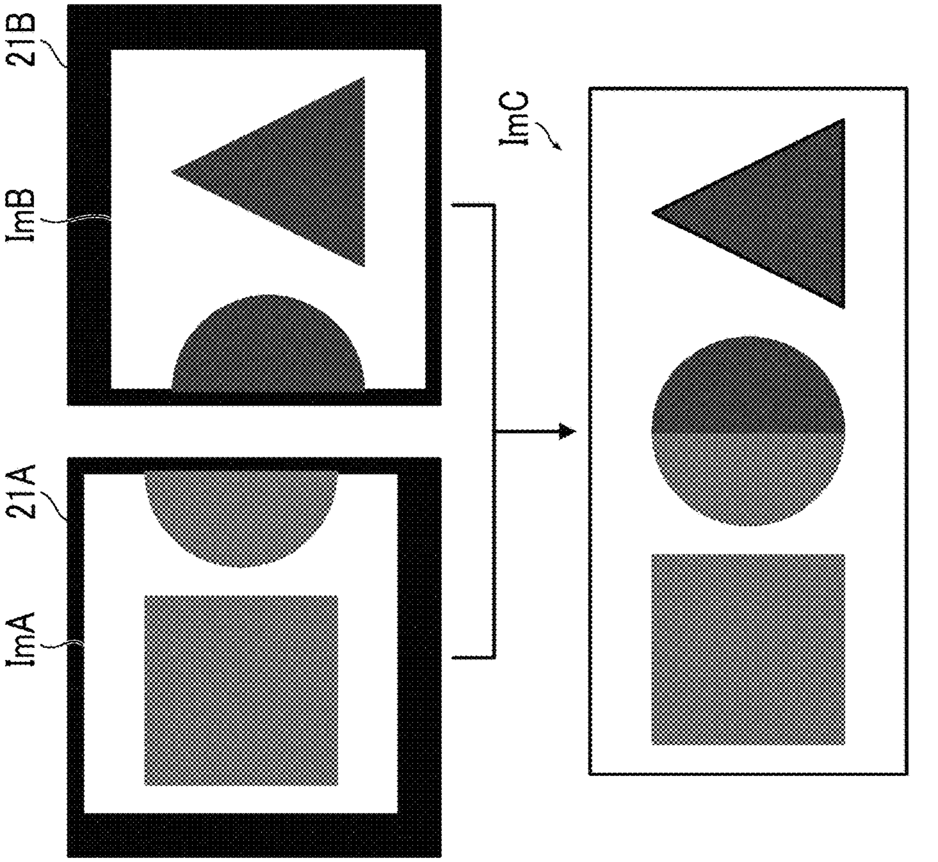
FIGS. 28A and 28B are conceptual diagrams in a case in which a composite state of images to be observed is electronically adjusted.
Figure 28A:
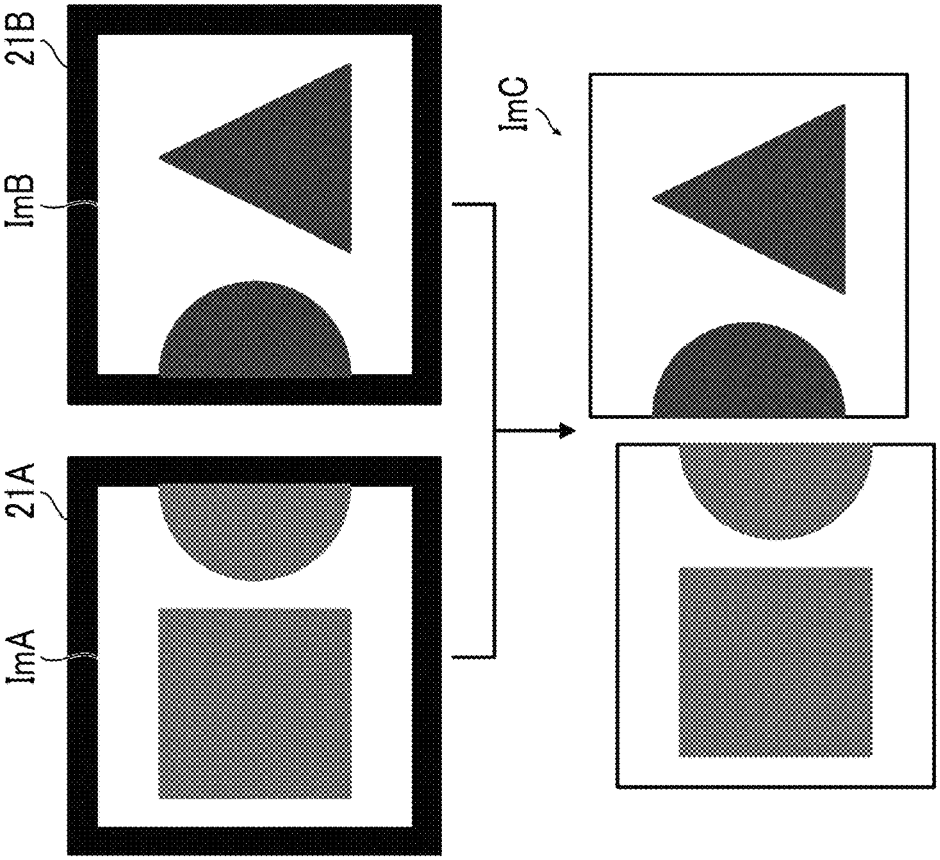

FIGS. 28A and 28B are conceptual diagrams in a case in which the composite state of the images to be observed is electronically adjusted. FIG. 28A is a diagram showing a relationship between display images ImA and ImB of the respective display elements before the adjustment and an observation image ImC. FIG. 28B is a diagram showing a relationship between the display images ImA and ImB of the respective display elements after the adjustment and the observation image ImC.

As shown in FIG. 28A, in a case in which the two images are observed separately, the positions of the images to be displayed on the respective display elements of the first display element 21A and the second display element 21B are adjusted. That is, as shown in FIG. 28B, the positions of the display image ImA and the display image ImB to be displayed on the first display element 21A and the second display element 21B are adjusted such that the two images are seamlessly combined.

[Configuration]

FIG. 29 is a block diagram showing an electrical configuration of the image display unit.

As shown in FIG. 29, the image display unit 10 according to the present embodiment includes an image input unit 400, a first display element drive unit 410A, a second display element drive unit 410B, a display control unit 420, and an operation unit 430.

The image input unit 400 inputs the image to be displayed on the image display unit. The image is input by wire or wirelessly.

The first display element drive unit 410A drives the first display element 21A to display the image in the display area of the first display element 21A.

The second display element drive unit 410B drives the second display element 21B to display the image in the display area of the second display element 21B.

The display control unit 420 generates the image to be displayed on each display element from the image input to the image input unit 400, and displays the image on each display element. Further, the display control unit 420 adjusts the position of the image to be displayed in the display area of each display element in response to an instruction from the operation unit 430. Therefore, the operation unit 430 comprises at least a function of instructing the movement of the position of the image to be displayed on each display element. The operation unit 430 can also be configured by, for example, a so-called remote controller.

Figure 30:
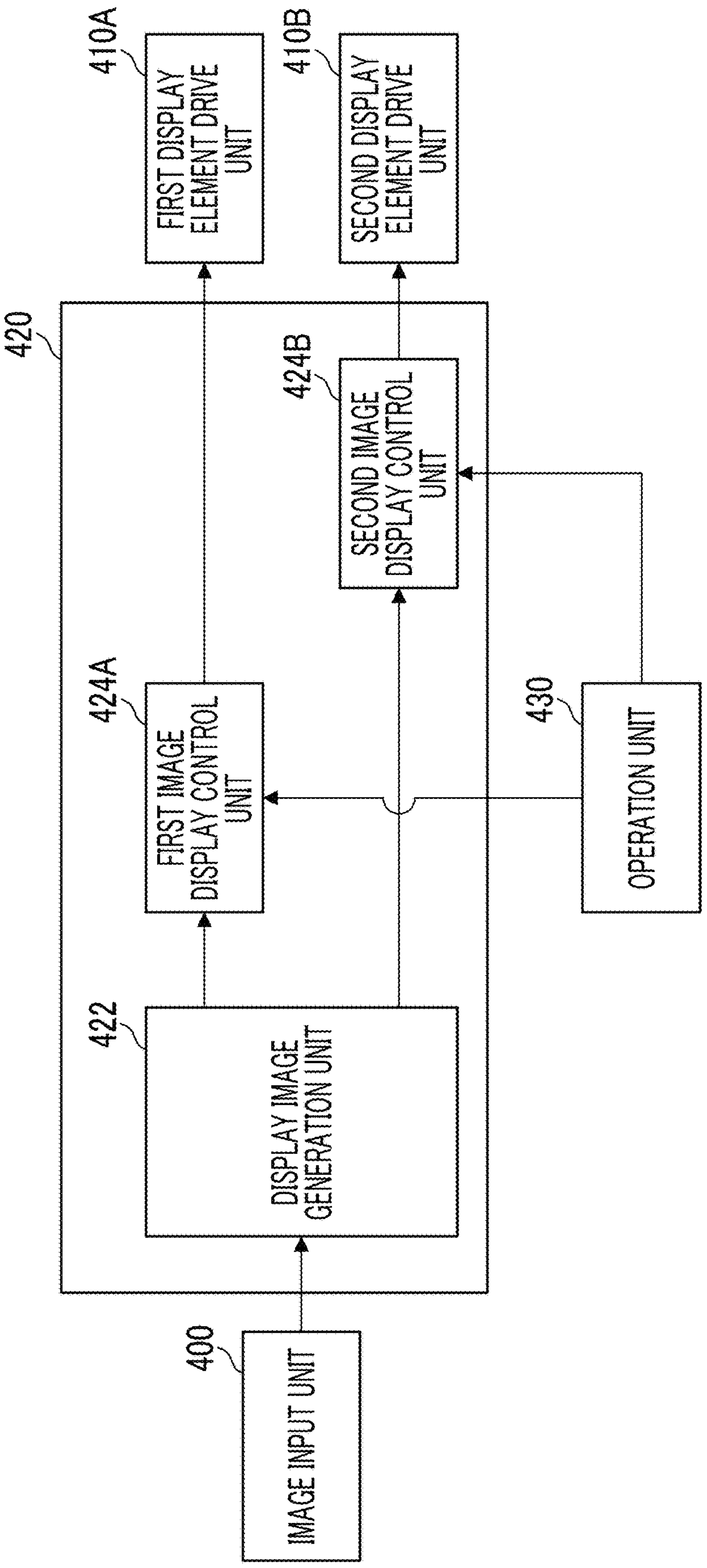
FIG. 30 is a block diagram of a function of a display control unit.

FIG. 30 is a block diagram of a function of the display control unit.

The display control unit 420 has functions of a display image generation unit 422, a first image display control unit 424A, and a second image display control unit 424B.

The display image generation unit 422 generates the images to be displayed on the first display element 21A and the second display element 21B from the image input to the image input unit 400. The image to be displayed on the first display element 21A is referred to as a first image, and the image to be displayed on the second display element 21B is referred to as a second image.

The first image display control unit 424A displays the first image generated by the display image generation unit 422 on the first display element 21A. In addition, the first image display control unit 424A receives an instruction to move a display position of the image from the operation unit 430 and moves the display position of the image in response to the received instruction.

The second image display control unit 424B displays the second image generated by the display image generation unit 422 on the second display element 21B. In addition, the second image display control unit 424B receives an instruction to move the display position of the image from the operation unit 430 and moves the display position of the image in response to the received instruction.

The display control unit 420 is composed of a computer comprising a processor and a memory, and each of the functions described above is realized by the processor executing a predetermined program.

The processor includes the central processing unit (CPU) that is a general-purpose processor, a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC). Also, the display control unit 420 may be composed of one of these various processors, or may be configured by two or more same type or different types of processors (for example, a plurality of FPGAs or a combination of the CPU and the FPGA). As described above, display control unit 420 is configured by one or more of the various processors described above, as the hardware structure. Further, the hardware structure of these various processors is, more specifically, an electric circuit in which circuit elements, such as semiconductor elements, are combined.

[Adjustment Procedure]

The adjustment of the image to be observed is performed as follows.

First, a predetermined test image is input to the image input unit 400, the image is displayed on each display unit, and the display state is checked. In this case, the image to be displayed on each display element is displayed at an origin position set in the display area of each display element. The origin position is set, for example, at the center of the display area of each display element. In this state, it is checked whether the two images are misaligned. As shown in FIG. 28A, in a case in which the two images to be observed are misaligned, the display position of the image is adjusted. That is, as shown in FIG. 28B, the position of the image to be displayed on each display element is adjusted such that the seam between the two images cannot be seen.

In this way, the composite state of the images to be displayed in each unit can also be adjusted by adjusting the position of the image to be displayed in the display element of each unit.

Modification Example

In a case in which the composite state of the images to be observed is electronically adjusted as in the image display unit according to the present embodiment, the mechanical adjustment mechanism can also be omitted. In other words, the mechanism that adjusts the relative disposition relationship between the first unit and the second unit can be omitted. In this case, the first unit and the second unit are attached to the base frame in a state in which the inclination, the position, and the like cannot be adjusted.

It should be noted that, by combining with the mechanical adjustment mechanism, the degree of freedom and width of the adjustment can be widened, and more detailed positioning can be performed.

Other Embodiments

[Combination of Adjustment Mechanism]

The adjustment mechanisms described in the respective embodiments can be used in combination as appropriate.

[Configuration of Image Display Unit]

In the embodiment described above, the case is described in which the two units are combined to form one image display unit, but the image display unit can be configured by combining two or more units. Therefore, for example, one image unit can be configured by combining three units. In this case, the disposition relationship is relatively adjusted between the respective units.

[Other Examples of Display Image Light Input Device]

The display image light input device is not limited to the display image light input device according to the embodiment described above, and the display image light input devices having various configurations can be used. For example, a display image light input device using a laser beam can be used. In the display image light input device using the laser beam, the image is generated by scanning with the laser beam. For example, the image is generated by emitting the laser beam from a tip of a fiber and scanning the tip of the fiber. Alternatively, the image is generated by scanning with the laser beam output from a light source unit using a scanning mirror.

[Other Examples of Light Guide Plate]

Figure 31:
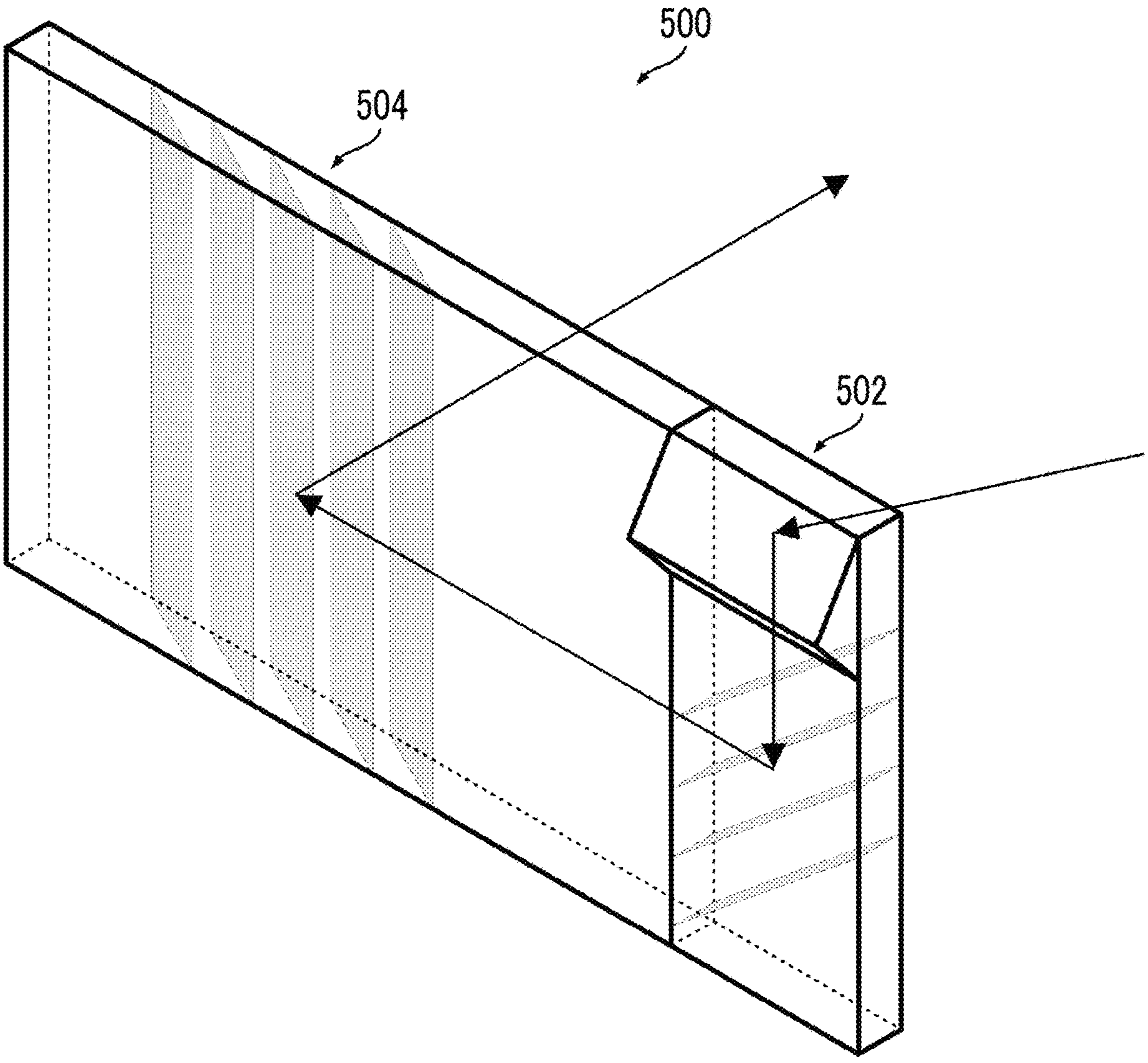
FIG. 31 is a diagram showing another example of a light guide plate.

FIG. 31 is a diagram showing another example of the light guide plate.

A light guide plate 500 shown in FIG. 31 is a light guide plate having a configuration in which the display image light input to an input portion 502 is propagated in the vertical direction and then propagated in the lateral direction to be output from an output portion 504. With the light guide plate 500 having the present configuration, the input position of the image display light can be adjusted. In addition, for example, a light guide plate using a diffraction grid can also be used as the light guide plate.

[Other Examples of Image Display Apparatus]

In the embodiments described above, as an example, the case is described in which the present invention is applied to the so-called eyeglass-type head mount type image display apparatus, but the image display apparatus to which the present invention is applied is not limited to this. The present invention can be widely applied to an image display apparatus having a configuration in which an image is observed by being disposed in front of the eyes.

EXPLANATION OF REFERENCES

1: head mount type image display apparatus
2: frame
10: image display unit
10A: first unit
10B: second unit
20A: first display image light input device
20B: second display image light input device
20*b*: housing of second display image light input device
21A: first display element
21B: second display element
22A: first input optical system
22B: second input optical system
30A: first light guide plate
30B: second light guide plate
31A: first input portion of first light guide plate
31B: second input portion of second light guide plate
32A: first output portion of first light guide plate
32B: second output portion of second light guide plate
33A: first input surface of first light guide plate
33B: second input surface of second light guide plate
34A: mirror of first light guide plate
34B: mirror of second light guide plate
35A: first output surface of first light guide plate
35B: second output surface of second light guide plate
36A: half mirror of first light guide plate
36B: half mirror of second light guide plate
110: first frame
112: first frame body
122A: screw contact portion
114: first display image light input device attachment portion
116*a*: first frame screwing portion
116*b*: first frame screwing portion
116*c*: first frame screwing portion
118: hole of first frame screwing portion
120: second frame
122: second frame body
124: second display image light input device attachment portion
126*a*: second frame screwing portion
126*b*: second frame screwing portion
126*c*: second frame screwing portion
128: hole of second frame screwing portion
130: base frame
132: inner peripheral portion of base frame
140: second unit inclination adjusting screw
142*a*: second unit attachment portion
142*b*: second unit attachment portion
142*c*: second unit attachment portion
144: screw hole of second unit attachment portion
146: second unit biasing spring
148: spacer
150: first unit fixing screw
160: first unit position adjusting screw
162*a*: first unit attachment portion
162*b*: first unit attachment portion
162*c*: first unit attachment portion
164: screw hole of first unit attachment portion
166: first unit biasing spring
210: lateral position adjustment mechanism
212: lateral biasing spring
214: lateral position adjusting screw
216: bracket
218: bracket
220: vertical position adjustment mechanism
222: vertical biasing spring
224: vertical position adjusting screw
226: bracket
228: bracket
300: inclination adjustment mechanism
302: second display image light input device screwing portion
304: hole of second display image light input device screwing portion
306: second display image light input device position adjusting screw
308: screw hole of second display image light input device attachment portion
310: second display image light input device biasing spring
400: image input unit
410A: first display element drive unit
410B: second display element drive unit
420: display control unit
422: display image generation unit
424A: first image display control unit
424B: second image display control unit
430: operation unit
500: light guide plate
502: input portion of light guide plate
504: output portion of light guide plate
ImA: display image of first display element
ImB: display image of second display element
ImC: observation image

What is claimed is:

1. An image display apparatus comprising:

a plurality of display image light input devices that input display image light;

a plurality of light guide plates that are disposed in a superimposed manner, receive input of the display image light individually from the plurality of display image light input devices, and propagate the input display image light to an output surface while individually reflecting the input display image light; and a first adjustment mechanism that includes a holding member that holds the plurality of light guide plates in a superimposed manner, and adjusts a disposition relationship of the plurality of light guide plates held by the holding member.

2. The image display apparatus according to claim 1, wherein the first adjustment mechanism relatively adjusts an inclination and/or a position between the plurality of light guide plates.

3. The image display apparatus according to claim 1, wherein the first adjustment mechanism individually adjusts the disposition relationship of the plurality of light guide plates with respect to the holding member.

4. The image display apparatus according to claim 3, wherein the holding member holds the light guide plate at a plurality of holding points set in the same plane, and the first adjustment mechanism individually adjusts an interval between the light guide plate and the holding member at each holding point, and individually adjusts the disposition relationship of the plurality of light guide plates with respect to the holding member.

5. The image display apparatus according to claim 4, wherein the first adjustment mechanism includes a fastening member that fastens the light guide plate and the holding member at each holding point, and a biasing member that biases the light guide plate and the holding member in a direction in which the light guide plate and the holding member are spaced from each other, at each holding point.

6. The image display apparatus according to claim 4, wherein the first adjustment mechanism includes a fastening member that fastens the light guide plate and the holding member at each holding point, and a spacer member that is disposed between the light guide plate and the holding member at each holding point.

7. The image display apparatus according to claim 3, wherein the plurality of light guide plates are disposed in a superimposed manner on one side of the holding member, and are held by the holding member.

8. The image display apparatus according to claim 3, wherein the holding member is disposed between the respective superimposed light guide plates, and the plurality of light guide plates are held by the holding member.

9. The image display apparatus according to claim 1, wherein the first adjustment mechanism includes a spacer member that is inserted between the plurality of light guide plates, and adjusts a relative disposition relationship between the plurality of light guide plates by adjusting a position and/or a thickness for inserting the spacer member.

10. The image display apparatus according to claim 1, wherein the display image light input device is assembled to the light guide plate, and the light guide plate and the display image light input device are moved together in a case of adjustment via the first adjustment mechanism.

11. The image display apparatus according to claim 1, wherein the light guide plate is moved independently of the display image light input device in a case of adjustment via the first adjustment mechanism.

12. The image display apparatus according to claim 1, further comprising:

a plurality of second adjustment mechanisms that individually adjust a relative disposition relationship between each light guide plate and the display image light input device.

13. The image display apparatus according to claim 12, wherein the second adjustment mechanism relatively adjusts an inclination and/or a position between the light guide plate and the display image light input device.

14. The image display apparatus according to claim 1, further comprising:

a processor, wherein the processor receives an instruction for adjustment of a position at which the display image light input device inputs the display image light to the light guide plate, and adjusts the position at which the display image light input device inputs the display image light to the light guide plate, in response to the received instruction for adjustment.

15. An image display apparatus comprising:

a plurality of display image light input devices that input display image light;

a plurality of light guide plates that are disposed in a superimposed manner, receive input of the display image light individually from the plurality of display image light input devices, and propagate the input display image light to an output surface while individually reflecting the input display image light;

a holding member that holds the plurality of light guide plates in a superimposed manner; and a plurality of third adjustment mechanisms that individually adjust a disposition relationship of the display image light input device with respect to each light guide plate held by the holding member.

16. The image display apparatus according to claim 15, wherein the third adjustment mechanism relatively adjusts an inclination and/or a position between the light guide plate and the display image light input device.

17. The image display apparatus according to claim 15, further comprising:

a processor, wherein the processor receives an instruction for adjustment of a position at which the display image light input device inputs the display image light to the light guide plate, and adjusts the position at which the display image light input device inputs the display image light to the light guide plate, in response to the received instruction for adjustment.

* * * * *